United States Patent
Rose et al.

(10) Patent No.: US 7,162,611 B2
(45) Date of Patent: Jan. 9, 2007

(54) UNHANDLED OPERATION HANDLING IN MULTIPLE INSTRUCTION SET SYSTEMS

(75) Inventors: Andrew Christopher Rose, Cambridge (GB); Edward Colles Nevill, Huntingdon (GB)

(73) Assignee: ARM Limited, Cambridge (GB)

( * ) Notice: Subject to any disclaimer, the term of this patent is extended or adjusted under 35 U.S.C. 154(b) by 807 days.

(21) Appl. No.: 10/136,346

(22) Filed: May 2, 2002

(65) Prior Publication Data

US 2002/0188826 A1 Dec. 12, 2002

(30) Foreign Application Priority Data

May 31, 2001 (GB) ................................. 0113197.8

(51) Int. Cl.
*G06F 9/455* (2006.01)
(52) U.S. Cl. ...................................... 712/209; 712/244
(58) Field of Classification Search ................ 712/209, 712/244
See application file for complete search history.

(56) References Cited

U.S. PATENT DOCUMENTS

| | | | |
|---|---|---|---|
| 3,889,243 A | 6/1975 | Drimak | |
| 4,236,204 A | 11/1980 | Groves | |
| 4,587,632 A | 5/1986 | Ditzel | |
| 4,922,414 A | 5/1990 | Holloway et al. | |
| 4,969,091 A | 11/1990 | Muller | |
| 5,136,696 A | 8/1992 | Beckwith et al. | |
| 5,455,775 A | 10/1995 | Huber et al. | |
| 5,619,665 A | 4/1997 | Emma | |
| 5,638,525 A | 6/1997 | Hammond et al. | |
| 5,659,703 A | 8/1997 | Moore et al. | |
| 5,740,461 A | 4/1998 | Jaggar | |
| 5,742,802 A | 4/1998 | Harter et al. | |
| 5,752,035 A | 5/1998 | Trimberger | |
| 5,781,750 A * | 7/1998 | Blomgren et al. | .......... 712/209 |
| 5,784,584 A | 7/1998 | Moore et al. | |
| 5,809,336 A | 9/1998 | Moore et al. | |
| 5,838,948 A | 11/1998 | Bunza | |
| 5,875,336 A | 2/1999 | Dickol et al. | |
| 5,892,966 A | 4/1999 | Petrick et al. | |
| 5,905,893 A | 5/1999 | Worrell | |
| 5,925,123 A | 7/1999 | Tremblay et al. | |
| 5,926,832 A | 7/1999 | Wing et al. | |

(Continued)

FOREIGN PATENT DOCUMENTS

EP 0 813 144 12/1997

(Continued)

OTHER PUBLICATIONS

H. Stone, Chapter 12—"A Pipeline Push-Down Stack Computer", 1969, pp. 235-249.

(Continued)

*Primary Examiner*—Eric Coleman
(74) *Attorney, Agent, or Firm*—Nixon & Vanderhye P.C.

(57) ABSTRACT

Unhandled operation of a program instruction of a first instruction set, such as a Java bytecode, is detected. Instead of invoking a mechanism for directly dealing with that unhandled operation, one or more instructions from a second instruction set, such as ARM instructions, are instead used to emulate the instruction that was subject to the unhandled operation. If these instructions of the second instruction set are also subject to unhandled operation, then the mechanisms for dealing with unhandled operation within that second instruction set may be invoked to repair that operation. This approach is well suited to dealing with unhandled operation of variable length instructions being interpreted with a processor core having a native fixed length instruction set. In particular, prefetch aborts and unhandled floating point operations may be conveniently dealt with in this way.

60 Claims, 21 Drawing Sheets

U.S. PATENT DOCUMENTS

| | | | |
|---|---|---|---|
| 5,937,193 | A | 8/1999 | Evoy |
| 5,953,741 | A | 9/1999 | Evoy et al. |
| 6,003,126 | A | 12/1999 | Huynh et al. |
| 6,009,499 | A | 12/1999 | Koppala |
| 6,009,509 | A | 12/1999 | Leung et al. |
| 6,014,723 | A | 1/2000 | Tremblay et al. |
| 6,021,265 | A | 2/2000 | Nevill |
| 6,021,469 | A | 2/2000 | Tremblay et al. |
| 6,026,485 | A | 2/2000 | O'Connor et al. |
| 6,031,992 | A | 2/2000 | Cmelik et al. |
| 6,038,643 | A | 3/2000 | Tremblay et al. |
| 6,070,173 | A | 5/2000 | Huber et al. |
| 6,088,786 | A | 7/2000 | Feierbach et al. |
| 6,122,638 | A | 9/2000 | Huber et al. |
| 6,125,439 | A | 9/2000 | Tremblay et al. |
| 6,148,391 | A | 11/2000 | Petrick |
| 6,298,434 | B1 | 10/2001 | Lindwer |
| 6,317,872 | B1 | 11/2001 | Gee et al. |
| 6,332,215 | B1 | 12/2001 | Patel et al. |
| 6,338,134 | B1 | 1/2002 | Leung et al. |
| 6,349,377 | B1 | 2/2002 | Lindwer |
| 6,374,286 | B1 | 4/2002 | Gee et al. |
| 6,480,952 | B1 * | 11/2002 | Gorishek et al. .......... 712/227 |
| 6,606,743 | B1 | 8/2003 | Raz et al. |
| 6,631,514 | B1 * | 10/2003 | Le ........................ 717/137 |
| 6,718,539 | B1 * | 4/2004 | Cohen et al. ............ 717/136 |
| 6,941,545 | B1 * | 9/2005 | Reese et al. ............ 717/130 |

FOREIGN PATENT DOCUMENTS

| | | |
|---|---|---|
| EP | 0 939 370 A1 | 9/1999 |
| GB | 2357876 A | 7/2001 |
| JP | 2000-515270 | 11/2000 |
| WO | WO 97/27537 | 7/1997 |

OTHER PUBLICATIONS

C. Glossner et al, "Delft-Java Link Translation Buffer", Aug. 1998.
N. Vijaykrishnan et al, "Object-Oriented Architectural Support For a Java Processor" 1998, pp. 330-355.
C. Glossner et al, "The Delft-Java Engine: An Introduction", Aug. 1997.
K. Ebcioglu et al, "A Java ILP Machine Based On Fast Dynamic Compilation", Jan. 1997, pp. 1-13.
A. Wolfe, "First Java-specific chip takes wing" *EETimes*—1997.
Y. Patt, *Introduction to Computer Systems From Bits and Gates to C and Beyond*, 1999, pp. 1-517.
M. Ertl, "Stack Caching for Interpreters" 1994, pp. 1-13.
M. Ertl, "Stack Caching for Interpreters" 1995, pp. 1-13.
M. Ertl, "Implementation of Stack-Based Languages on Register Machines" Apr. 1996, pp. 1-4.
J. O'Connor et al, "PicoJava-I: The Java Virtual Machine in Hardware" *IEEE Micro* A Case for Intelligent RAM, Mar./Apr. 1997, pp. 45-53.
K. Andrews et al, "Migrating a CISC Computer Family Onto RISC Via Object Code Translation" 1992, pp. 213-222.
"PicoJava I Microprocessor Core Architecture" Oct. 1996, pp. 1-8, Sun Microsystems.
M. Ertl, "A New Approach to Forth Native Code Generation" 1992.
M. Maierhofer et al, "Optimizing Stack Code" 1997, p. 19.
D. Ungar et al, "Architecture of SOAR: Smalltalk on a RISC" The 11th Annual International Symposium on Computer Architecture, Jun. 1984, pp. 188-197.
O. Steinbusch, "Designing Hardware to Interpret Virtual Machine Instructions" Feb. 1998, pp. 1-59.
R. Kapoor et al, "Stack Renaming of the Java Virtual Machine" Dec. 1996, pp. 1-17.
A. Yonezawa et al, "Implementing Concurrent Object-Oriented Languages in Multicomputers" *Parallel and Distributed Technology (Systems and Applications)* May 1993, pp. 49-61.
C. Hsieh et al, "Java Bytecode to Native Code Translation; The Caffeine Prototype and Preliminary Results" IEEE/ACM International Symposium on Microarchitecture, Dec. 1996, pp. 90-97.
Y. Patt et al, *Introduction to Computer Systems From Bits and Gates to C and Beyond*, 2001, pp. 1-526.
Sun Microsystems PicoJava Processor Core Data Sheet, Dec. 1997, pp. 1-11.
H. McGhan et al, PicoJava A Direct Execution Engine for Java Bytecode, Oct. 1998, pp. 22-26.
C. Glossner et al, "Parallel Processing" Euro-Par 1997: Passau, Germany, Aug. 1997.
Y. Patt, *Introduction to Computer Systems From Bits and Gates to C and Beyond*, 1999, pp. 10-12 & 79-82.
Espresso—The High Performance Java Core Specification, Oct. 2001, pp. 1-33, Aurora VLSI, Inc.
J. Gosling, "Java Intermediate Bytecodes" 1995, pp. 111-118.
P. Koopman, Jr. "Stack Computers The New Wave" 1989, pp. 1-234.
M. Mrva et al, "A Scalable Architecture for Multi-Threaded JAVA Applications" Design Automation and Test in Europe, Feb. 1998, pp. 868-874.
L. Chang et al, "Stack Operations Folding in Java Processors" *IEEE Proc.—Comput. Digit. Tech.*, vol. 145, No. 5, pp. 333-340 Sep. 1998.
L. Ton et al, Proceedings of the '97 International Conference on Parallel and Distributed Systems, "Instruction Folding in Java Processor", pp. 138-143, Dec. 1997.
K. Buchenrieder et al, "Scalable Processor Architecture for Java With Explicit Thread Support" *Electronics Letters* vol. 33, No. 18, pp. 1532+, Aug. 1997.
C. Chung et al, Proceedings of the '98 International Conference on Parallel and Distributed Systems, "A Dual Threaded Java Processor for Java Multithreading" pp. 693-700, Dec. 1998.
I. Kazi et al, "Techniques for Obtaining High Performance in Java Programs" Sep. 2000, pp. 213-240.
R. Kieburtz, "A RISC Architecture for Symbolic Computation" 1987, pp. 146-155.
M. Berekovic et al, "Hardware Realization of a Java Virtual Machine for High Performance Multimedia Applications" *Signal Processing Systems SIPS 98*, pp. 479-488, 1997.
P. Deutsch, "Efficient Implementation of the Smalltalk-80 System" 1983, pp. 297-302.
"Rockwell Produces Java Chip" Sep. 1997, CNET News.com.
Y. Patt et al, *Introduction to Computing Systems from Bits and Gates to C and Beyond*, 2001, pp. 1-16, 91-118 & 195-209.
Ludwig Classeb, "Wissensspeicher 80286—Programmierung" pp. 14-15, 32-35, Veb Verlag Technik.

* cited by examiner do_iadd

| | | |
|---|---|---|
| LDRB | R4, [R14, #1]! | Load next Java bytecode and update bytecode pointer |
| LDR | R1, [Rstack, #-4]! | POP first operand from stack |
| LDR | R0, [Rstack, #-4]! | POP second operand from stack |
| LDR | R12, [Rexc, R4, LSL #2] | Get address of code fragment for next bytecode |
| ADD | R0, R0, R1 | Perform integer add |
| STR | R0, [Rstack], #4 | PUSH result to stack |
| BXJ | R12 | Do next bytecode in hardware/software |

| Bytecode | Operation |
|---|---|
| 0 | Fixed 0 |
| 1 | Fixed 1 |
| ⋮ | ⋮ |
| 201 | Fixed 201 |
| 202 | Fixed 202 |
| | |
| 254 | Fixed 254 |
| 255 | Fixed 255 |

Fixed bindings: rows 0–202
Programable bindings: rows 203–253
Fixed bindings: rows 254–255

FIG. 7

(PA (Half1) = False) AND (PA (Half2) = True)

AND ( ((Number of operands = 1) AND (bcadd [1:0] = 11))
OR ((Number of operands = 2) AND (bcadd [1] = 1)))

```
+---------------+
|               |   +-----------------+
| Figure 1      |---| Floating Point  |   FIG. 21
|               |   | Subsystem       |
|               |   +-----------------+
+---------------+
```

```
+---------------+
|               |   +-----------------+   FIG. 22
| Figure 1      |---| Floating Point  |
|               |   | Subsystem       |
|               |   |                 |
|               |   |  +---------+    |
|               |   |  |         | <------ Floating Point Operation Register
|               |   |  +---------+    |
|               |   |  +-+            |
|               |---|  | | <------------- Unhandled Operation State Flag
|               |   |  +-+            |
|               |   +-----------------+
+---------------+
```

| Single precision |                       | Double precision |                       |
|------------------|-----------------------|------------------|-----------------------|
| fadd             | FADDS Sd, Sn, Sm      | dadd             | FADDD Dd, Dn, Dm      |
| fsub             | FSUBS Sd, Sn, Sm      | dsub             | FSUBD Dd, Dn, Dm      |
| fmul             | FMULS Sd, Sn, Sm      | dmul             | FMULD Dd, Dn, Dm      |
| fdiv             | FDIVS Sd, Sn, Sm      | ddiv             | FDIVD Dd, Dn, Dm      |
| frem             | Not implemented in HW | drem             | Not implemented in HW |
| fneg             | FNEGS Sd, Sm          | dneg             | FNEGD Dd, Dm          |
| f2d              | FCVTDS Dd, Sm         | d2f              | FCVTSD Sd, Dm         |
| f2i              | FTOSIZS Sd, Sm        | d2i              | FTOSIZD Sd, Dm        |
| f2l              | Not implemented in HW | d2l              | Not implemented in HW |
| i2f              | FSITOS Sd, Sm         | i2d              | FSITOD Dd, Sm         |
| l2f              | Not implemented in HW | l2d              | Not implemented in HW |
| fcmpl            | FCMPS/FMSTAT          | dcmpl            | FCMPD/FMSTAT          |
| fcmpg            | FCMPS/FMSTAT          | dcmpg            | FCMPD/FMSTAT          |

FIG. 23

```
dmul
        FMULD   D1, D2, D1
dcmpg
        FCMPD   D0, D1
        FMSTAT
        MVNMI   R0, #0
        MOVEQ   R0, #0
        MOVGT   R0, #1
<next Java bytecode>
```

FIG. 24

```
FMULD    D1, D2, D1              ; Causes unhandled operation
FCMPD    D0, D1                  ; Unhandled operation signalled here
   |
   +--------------------+
     To ARM state to     |        ; unhandled operation handler executes
     emulate byte code   |        ; VFP read status instruction to
                 FMRX Rd, FPSCR   ; trigger VFP exception handling
                         |        ; if unhandled operation state flag
                         |        ; is set
                         +------------------------+
           Unhandled operation state flag is      |
           set so perform VFP exception handling  |
                                                  |
                              <Read Floating Point Operation Register>
                              <Emulate FMULD tos-1, tos, tos-1 in SW>
                              <Clear Unhandled Operation State Flag>
                                                  |
                         +------------------------+
                         | Return to unhandled operation handler
           <Re-attempt execution of FMRX Rd, FPSCR instruction,
           without triggering VFP exception handling this time>

<Flush Java stack to memory>

LDRB    R4, [R14]            ; Load bytecode which triggered
                                        ; unhandled operation
           LDR     R12, [Rexc, R4, LSL #2] ; Get address of code fragment
                                        ; to emulate 'dcmpg' instruction
           BX      R12                  ; Branch to code fragment.
                   |                    ; Note use of BX rather than
                   |                    ; BXJ because we do not want
                   |                    ; this to be executed in HW
                   V
           Branch to dcmpg emulation code
                   |
                   V LDRB    R4, [R14, #1]!       ; Load next Java bytecode
                                        ; and update bytecode pointer
           FLDD    D1, [Rstack, #-8]!   ; Pop first operand from stack
                                        ; 1 Double = 2 stack words
           FLDD    D0, [Rstack, #-8]!   ; Pop second operand from stack
                                        ; 1 Double = 2 stack words
           LDR     R12, [Rexc, R4, LSL #2] ; Get address of code fragment
                                        ; for next bytecode
           FCMPD   D0, D1               ; Compare the 2 doubles
           FMSTAT                       ; Read result of compare
           MVNMI   R0, #0               ; Result = -1 if <
           MOVEQ   R0, #0               ; Result = 0 if =
           MOVGT   R0, #1               ; Result = 1 if >
           STR     R0, [Rstack], #4     ; Push result to stack
           BXJ     R12                  ; Do next bytecode in
                                        ; hardware/software
```

FIG. 25

```
FMULD    D1, D2, D1              ; Executes as normal
FCMPD    D0, D1                  ; Causes unhandled operation
FMSTAT                           ; Unhandled operation signalled here
    |
    +--------------------+
    To ARM state to      |        ; unhandled operation handler executes
    emulate byte code    |        ; VFP read status instruction to
                  FMRX Rd, FPSCR  ; trigger VFP exception handling
                         |        ; if unhandled operation state flag
                         |        ; is set
                         +-----------------------+
         Unhandled operation state flag is       |
         set so perform VFP exception handling   |
                                                 |
                         <Read Floating Point Operation Register>
                         <Emulate FCMPD tos-1, tos>
                         <Clear Unhandled Operation State Flag>
                                                 |
                         +-----------------------+
                         | Return to unhandled operation handler
         <Re-attempt execution of FMRX Rd, FPSCR instruction,
         without triggering VFP exception this time>

<Flush Java stack to memory>

LDRB    R4, [R14]              ; Load bytecode which triggered
                                        ; unhandled operation
         LDR     R12, [Rexc, R4, LSL #2] ; Get address of code fragment
                                        ; to emulate 'dcmpg' instruction
         BX      R12                    ; Branch to code fragment.
                 |                      ; Note use of BX rather than
                 |                      ; BXJ because we do not want
                 |                      ; this to be executed in HW
                 V
         Branch to dcmpg emulation code
                 |
                 V LDRB    R4, [R14, #1]!         ; Load next Java bytecode
                                        ; and update bytecode pointer
         FLDD    D1, [Rstack, #-8]!     ; Pop first operand from stack
                                        ; 1 Double = 2 stack words
         FLDD    D0, [Rstack, #-8]!     ; Pop second operand from stack
                                        ; 1 Double = 2 stack words
         LDR     R12, [Rexc, R4, LSL #2] ; Get address of code fragment
                                        ; for next bytecode
         FMULD   D0, D0, D1             ; Retry the multiply, This will
                                        ; encounter the same problem as
                                        ; before, detected precisely,
                                        ; but executing ARM instructions
                                        ; rather than bytecodes. The VFP
                                        ; exception handler can handle
                                        ; this without problems
         FSTD    D0, [Rstack], #8       ; Push result, 2 words
         BXJ     R12                    ; Do next bytecode (dcmpg) in
                                        ; hardware/software
```

FIG. 27

```
FMULD   D1, D2, D1
FCMPD   D0, D1                      ; Causes and signals unhandled operation
         |
        +------------------------+
To ARM state to             |         ; unhandled operation handler executes
emulate byte code           |         ; VFP read status instruction to
                    FMRX Rd, FPSCR    ; trigger VFP exception handling
                            |         ; if unhandled operation state flag
                            |         ; is set. Since with precise unhandled
                            |         ; operation detectection there is no
                            |         ; unhandled operation state flag the
                            |         ; VFP exception handling will never
                            |         ; be triggered
                            |
    <Flush Java stack to memory>

LDRB    R4, [R14]            ; Load bytecode which triggered
                                     ; unhandled operation
        LDR     R12, [Rexc, R4, LSL #2]  ; Get address of code fragment
                                     ; to emulate 'dcmpg' instruction
        BX      R12                  ; Branch to code fragment.
                |                    ; Note use of BX rather than
                |                    ; BXJ because we do not want
                |                    ; this to be executed in HW
                V
Branch to dcmpg emulation code
                |
                V
        LDRB    R4, [R14, #1]!       ; Load next Java bytecode
                                     ; and update bytecode pointer
        FLDD    D1, [Rstack, #-8]!   ; Pop first operand from stack
                                     ; 1 Double = 2 stack words
        FLDD    D0, [Rstack, #-8]!   ; Pop second operand from stack
                                     ; 1 Double = 2 stack words
        LDR     R12, [Rexc, R4, LSL #2]  ; Get address of code fragment
                                     ; for next bytecode
        FCMPD   D0, D1               ; Retry the comparison. This will
                                     ; encounter the same problem as
                                     ; before, detected precisely,
                                     ; but executing ARM instructions
                                     ; rather than bytecodes. The VFP
                                     ; exception handler can handle
                                     ; this without problems
        FMSTAT                       ; Read result of compare
        MVNMI   R0, #0               ; Result = -1 if <
        MOVEQ   R0, #0               ; Result = 0 if =
        MOVGT   R0, #1               ; Result = 1 if >
        STR     R0, [Rstack], #4     ; Push result to stack
        BXJ     R12                  ; Do next bytecode in
                                     ; hardware/software
```

FIG. 30

UNHANDLED OPERATION HANDLING IN MULTIPLE INSTRUCTION SET SYSTEMS

BACKGROUND OF THE INVENTION

1. Field of the Invention

This invention relates to the field of data processing systems. More particularly, this invention relates to the handling of unhandled operations within systems supporting multiple instruction sets.

2. Description of the Prior Art

It is known to provide data processing systems that support multiple instruction sets. An example of such systems are the Thumb enabled processors produced by ARM Limited of Cambridge, England. These Thumb enabled processors support the execution of both 32-bit ARM instructions and 16-bit Thumb instructions.

Within a data processing system it can sometimes occur that a program instruction cannot be handled directly by the data processing system. Accordingly, it is known to provide mechanisms that handle such unhandled operations. An example of such a situation is prefetch instruction aborts. It is known that when prefetching instructions in a virtual memory system an instruction load can cross a page boundary and an abort can occur due to the new page not yet being properly mapped within the virtual memory system. The correct mapping can then be put in place and the instruction prefetch reissued.

A further example of such a situation is the execution floating point instructions. It is known that during execution of a floating point operation situations may occur which cannot be handled directly by the data processing system. This is particularly true of floating point systems compatible with the IEEE 754 specification. Examples of such situations are division by zero, any operations involving a NaN, any operation involving an infinity or certain operations involving denormalised numbers.

A problem arises in that when a new instruction set is added considerable effort and development is needed to ensure that appropriate abort mechanisms for all the aborts that can occur are in place.

A particular problem arises when an unhandled floating point operation occurs. Many systems rely on examination of the instruction stream to determine the floating point operation that was not handled. With a new instruction set these systems have to be rewritten to cater for the new instruction set. In addition a problem occurs when the new instruction set can generate multiple floating point operations for a single instruction of the new instruction set. In this case it may be impossible to the system to determine which floating point operation was not handled by examination of the instruction stream since a single instruction may give rise to more than one unhandled floating point operation.

A further problem occurs when the unhandled floating point operations are imprecise, that is to say, the unhandled floating point operation is not detected at the point at which the instruction generating the floating point operation is executed, but instead is detected some time later. This situation occurs because of the parallel nature of many floating point systems. The data processing system on encountering an instruction specifying a floating point operation issues the floating point operation to a floating point subsystem. Once the floating point operation has been issued to the floating point subsystem, the main data processing system continues execution of further instructions in the instruction stream. Many instructions may be executed before the floating point subsystem detects the unhandled floating point operation and signals the unhandled operation condition to the main data processing system. In this case the cause of the unhandled floating point operation cannot be determined by examination of the instruction stream. It is known in cases like this for the floating point system to contain a register which identifies the unhandled floating point operation, for example the Vector Floating Point system produced by ARM Limited of Cambridge, England.

In many systems it is not possible for the floating point subsystem to signal an unhandled operation to the main data processing system at an arbitrary point, unhandled operations may only be signalled to the main data processing system at well defined points where the main data processing system performs a handshake with the floating point subsystem. Typically these handshakes only occur on execution of an instruction specifying a floating point operation. In this case an unhandled floating point operation cannot be signalled to the main data processing system until the main data processing system executes a further instruction specifying a floating point operation.

The introduction of a new instruction set which may perform multiple floating point operations per instruction in conjunction with imprecise unhandled floating point operations causes very difficult problems or makes it impossible for the system to handle the unhandled floating point operation. The system cannot determine which instruction caused the unhandled floating point operation and it further cannot determine where execution in the instruction stream should continue once the unhandled floating point operation has been handled.

SUMMARY OF THE INVENTION

Viewed from one aspect the present invention provides apparatus for processing data under control of program instructions from a first instruction set and one or more further instruction sets, said apparatus comprising:

an unhandled operation detector operative to detect unhandled operation of a program instruction of said first instruction set; and an unhandled operation handler operative upon detection of said unhandled operation to trigger emulation of said instruction of said first instruction set using one or more instructions of at least one of said one or more further instruction sets.

The invention recognises that the above problems may be significantly reduced by arranging for the systems to recognise unhandled operations within a first instruction set but not necessarily seek to repair the situation and re-execute the first instruction set instruction concerned. Instead, the instruction of the first instruction set (a new instruction set) that gave rise to the unhandled operation is emulated with one or more instructions of the one or more further instruction sets (e.g. second instruction set). Depending upon the type of unhandled operation that occurred, it may be that the unhandled operation will not reoccur upon the emulation. Alternatively, if unhandled operation also occurs upon emulation using instructions of the one or more further instruction sets, the existing mechanisms for dealing with such unhandled operations of the one or more further instruction sets can be employed to overcome the unhandled operation.

The unhandled operation handler may issue instructions to clear the unhandled operation state of the data processing system. Some data processing systems contain one or more flags which record whether the data processing system is in an unhandled operation state. This flag may need to be cleared by the unhandled operation handler prior to emulation of the said instruction of said first instruction set. Whether or not the flag needs to be cleared depends on the type of unhandled operation and whether or not there is a flag associated with that unhandled operation type.

Whilst the present technique is of general applicability, it is particularly well suited to systems in which the first instruction set is a variable length instruction set and the one or more further instruction sets are fixed length instruction sets. This combination is one where new types of unhandled operation may be possible in the variable length instruction set that are not possible in the fixed length instruction set and in which the mechanisms developed to deal with those unhandled operations in the one or more further instruction sets are not readily adapted to deal with the unhandled operation when it arises in connection with the variable length first instruction set itself.

A particular situation in which the present technique is strongly advantageous is dealing with fetch aborts of variable length instructions. In such a situation, a variable length instruction may span more than one instruction word and it may not be clear as to the fetching of which instruction word gave rise to the unhandled operation. This causes difficulty in properly dealing with the unhandled operation.

The present technique is also particularly well suited to systems containing a floating point system or subsystem where a single instruction of the first instruction set may generate multiple floating point operations, or where the signalling of unhandled floating point operations is imprecise.

A particular situation in which the present technique is strongly advantageous is in systems where a single instruction of the first instruction set may generate multiple floating point operations in conjunction with imprecise signalling of unhandled floating point operations. In such a situation it may be impossible for the system to determine which instruction of the first instruction set caused the unhandled floating point operation.

The present technique overcomes this situation by triggering emulation of the instruction of the first instruction set which was executing when the unhandled floating point operation was triggered using one or more instructions of the one or more further instruction sets. The instruction of the first instruction set which was executing when the unhandled floating point operation was triggered may, or may not be the instruction which caused the unhandled floating point operation. Regardless of whether or not the instruction of the first instruction set which was executing when the unhandled floating point operation was triggered caused the unhandled floating point operation the emulation of the instruction of the first instruction set which was executing when the unhandled floating operation was triggered will cause the existing mechanisms for dealing with such unhandled operations of the one or more further instruction sets to be employed to overcome the unhandled operation.

Prior to emulation of the instruction of the first instruction set using instructions of the one or more further instruction sets, the unhandled floating point operation handler may need to clear the unhandled floating point operation flag if one exists.

If the instruction of the first instruction set which was executing when the unhandled floating point operation was triggered was the instruction which caused the unhandled floating point operation, the same unhandled floating point operation will recur when the instruction is emulated and the existing mechanisms for dealing with such unhandled operations of the one or more further instruction sets will be employed to overcome the unhandled operation.

If the instruction of the first instruction set which was executing when the unhandled floating point operation was triggered was not the instruction which caused the unhandled floating point operation because the data processing system employs imprecise unhandled floating point operation detection, the same unhandled floating point operation will not recur when the instruction is emulated. In this case the data processing system will usually have an unhandled floating point operation flag or equivalent mechanism for recording the fact that an unhandled floating point operation has occurred. In addition the data processing system will usually record the floating point operation which caused the unhandled floating point operation.

Clearing said flag or other mechanism used to record the fact that an unhandled floating point operation has occured will usually cause the existing mechanisms for dealing with such unhandled operations of the one or more further instruction sets to be employed to overcome the unhandled operation.

On other systems it may be necessary to test the flag or other mechanism and if it indicates that an unhandled floating point operation has been recorded then explicity employ mechanisms of the one or more further instruction sets for dealing with such unhandled operations prior to clearing of the flag or other mechanism. The employment of the mechanisms of the one or more further instruction sets for dealing with said unhandled operations may also automatically clear the flag or other mechanism in which case there is no need for the unhandled floating point operation handler to explicitly clear the flag or other mechanism.

On still other systems it may not be necessary to test the flag or other mechanism. Instead it may be sufficient to employ the mechanisms of the one or more further instruction sets for dealing with said unhandled operation. This may be sufficient because it is already known that the flag or other mechanism is set by virtue of the fact that the system is executing code in the unhandled floating point operation handler, or it may be the case that employing said mechanisms will involve the testing and possible subsequent clearing of said flag or other mechanism as an integral part of the employment of said mechanisms.

Regardless of the exact techniques employed in the unhandled floating point handler which may vary from one data processing system to another, in the case that the instruction of the first instruction set which was executing when the unhandled floating point operation was triggered was not the instruction which caused the unhandled floating point operation the unhandled floating point operation will be resolved prior to emulation of the instruction of the first instruction set which triggered the unhandled floating point operation. In this case emulation of the instruction of the first instruction set may or may not cause an unhandled operation. However it is not known whether it will cause an unhandled operation or not and therefore it is not possible to simply resume execution as this could cause a possible infinite loop with the unhandled floating point operation being repeatedly triggered and the unhandled floating point operation handler repeatedly reexecuting the instruction. Therefore the instruction of the first instruction set must be emulated and execution resumed on the following instruction.

The present technique is also particularly well suited to situations in which the one or more further instruction sets is a native instruction set of a processor core, which will tend to have a set of well developed abort handlers, and the first instruction set is an interpreted instruction set of the type for which it may be desired to add support at a later date. A particular example of such a variable length interpreted first instruction set would be Java bytecode instructions.

Viewed from another aspect the present invention provides a method of processing data under control of program instructions from a first instruction set and one or more further instruction sets, said method comprising the steps of:

detecting unhandled operation of a program instruction of said first instruction set; and upon detection of said unhandled operation triggering emulation of said instruction of said first instruction set using one or more instructions of at least one of said one or more further instruction sets.

Viewed from a further aspect the invention also provides a computer program product for controlling a data processing apparatus to processing data under control of program instructions from a first instruction set and one or more further instruction sets, said computer program product comprising:

unhandled operation handler logic operative upon detection of an unhandled operation to trigger emulation of said instruction of an instruction set that gave rise to said unhandled operation using one or more instructions of at least one of said one or more further instruction sets.

As well as expressing itself in terms of an apparatus and a method of operating an apparatus, the invention may also express itself in the form of computer support code serving as an unhandled operation handler. This support code may be distributed by way of a separate recordable media, embedded as firmware within an embedded processing system or in some other way.

The above, and other objects, features and advantages of this invention will be apparent from the following detailed description of illustrative embodiments which is to be read in connection with the accompanying drawings.

BRIEF DESCRIPTION OF THE DRAWINGS

FIG. 7 illustrates the mapping between Java bytecodes and processing operations;

FIG. 21 illustrates a data processing system incorporating bytecode translation hardware as in FIG. 1, further incorporating a floating point subsystem;

FIG. 22 illustrates a data processing system incorporating bytecode translation hardware as in FIG. 1 and a floating point subsystem as in FIG. 21, further incorporating a floating point operation register and an unhandled operation state flag;

FIG. 23 shows the ARM floating point instructions generated for Java floating point instructions;

FIG. 24 shows a sequence of ARM instructions that might be generated by the Java acceleration hardware for the Java 'dmul' and 'dcmpg' instructions;

FIG. 25 shows the sequence of operations when executing a 'dmul' instruction followed by a 'dcmpg' instruction where an unhandled floating point operation is caused by execution of the FCMPD instruction generated by the Java acceleration hardware for the Java 'dmul' instruction, the sequence of operations shown is for a system using imprecise unhandled operation detection corresponding to FIG. 22;

FIG. 27 shows the sequence of operations when executing a 'dmul' instruction followed by a 'dcmpg' instruction where an unhandle floating point operation is caused by execution of the FCMPD instruction generated by the Java acceleration hardware for the Java 'dcmpg' instruction, the sequence of operations shown is for a system using imprecise unhandled operation detection corresponding to FIG. 22;

FIG. 30 shows the sequence of operations when executing a 'dmul' instruction followed by a 'dcmpg' instruction where an unhandled floating point operation is caused by execution of the FCMPD instruction generated by the Java acceleration hardware for the Java 'dcmpg' instruction, the sequence of operations shown is for a system using precise unhandled operation detection corresponding to FIG. 21.

DESCRIPTION OF THE PREFERRED EMBODIMENTS

Figure 1:
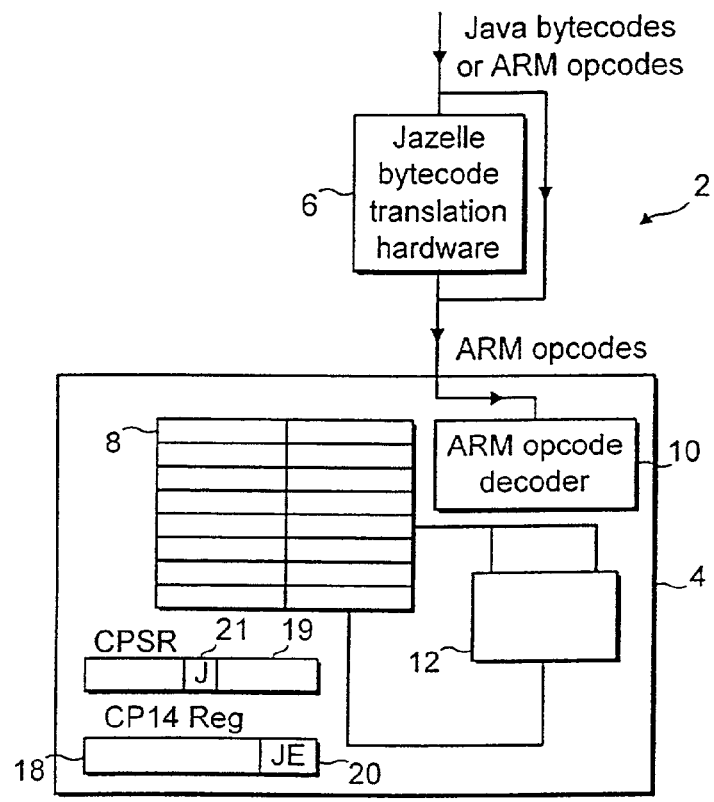
FIG. 1 illustrates a data processing system incorporating bytecode translation hardware.

FIG. 1 illustrates a data processing system 2 that incorporates a processor core 4, such as an ARM processor, and bytecode translation hardware 6 (also called Jazelle). The processor core 4 includes a register bank 8, an instruction decoder 10 and a datapath 12 for performing various data processing operations upon data values stored within the registers of the register bank 8. A register 18 is provided which includes a flag 20 which controls whether the bytecode translation hardware 6 is currently enabled or disabled. In addition, a register 19 is provided which includes a flag 21 which indicates whether the bytecode translation hardware is currently active or inactive. In other words flag 21 indicates whether the data processing system is currently execute Java bytecodes or ARM instructions. It will be appreciated that in other embodiments the registers 18 and 19 could be a single register containing both the flags 20 and 21.

In operation, if Java bytecodes are being executed and the bytecode translation hardware 6 is active, then Java bytecodes are received by the bytecode translation hardware 6 and serve to generate a sequence of corresponding ARM instructions (in this particular non-limiting example embodiment), or at least processor core controlling signals representing ARM instructions, that are then passed to the processor core 4. Thus, the bytecode translation hardware 6 may map a simple Java bytecode to a sequence of corresponding ARM instructions that may be executed by the processor core 4. When the bytecode translation hardware is inactive, it will be bypassed and normal ARM instructions can be supplied to the ARM instruction decoder 10 to control the processor core 4 in accordance with its native instruction set. It will be appreciated throughout that the sequences of ARM instructions could equally be sequences of Thumb instructions and/or mixtures of instruction from different instruction sets and such alternatives are envisaged and encompassed.

It will be appreciated that the bytecode translation hardware 6 may only provide hardware translation support for a subset of the possible Java bytecodes that may be encountered. Certain Java bytecodes may require such extensive and abstract processing that it would not be efficient to try and map these in hardware to corresponding ARM instruction operations. Accordingly, when the bytecode translation hardware 6 encounters such a non-hardware supported bytecode, it will trigger a software instruction interpreter written in ARM native instructions to perform the processing specified by that non-hardware supported Java bytecode.

The software instruction interpreter may be written to provide software support for all of the possible Java bytecodes that may be interpreted. If the bytecode translation hardware 6 is present and enabled, then only those Java bytecodes that are non-hardware supported will normally be referred out to the relevant code fragments within the software instruction interpreter. However, should bytecode translation hardware 6 not be provided, or be disabled (such as during debugging or the like), then all of the Java bytecodes will be referred to the software instruction interpreter.

Figure 2:
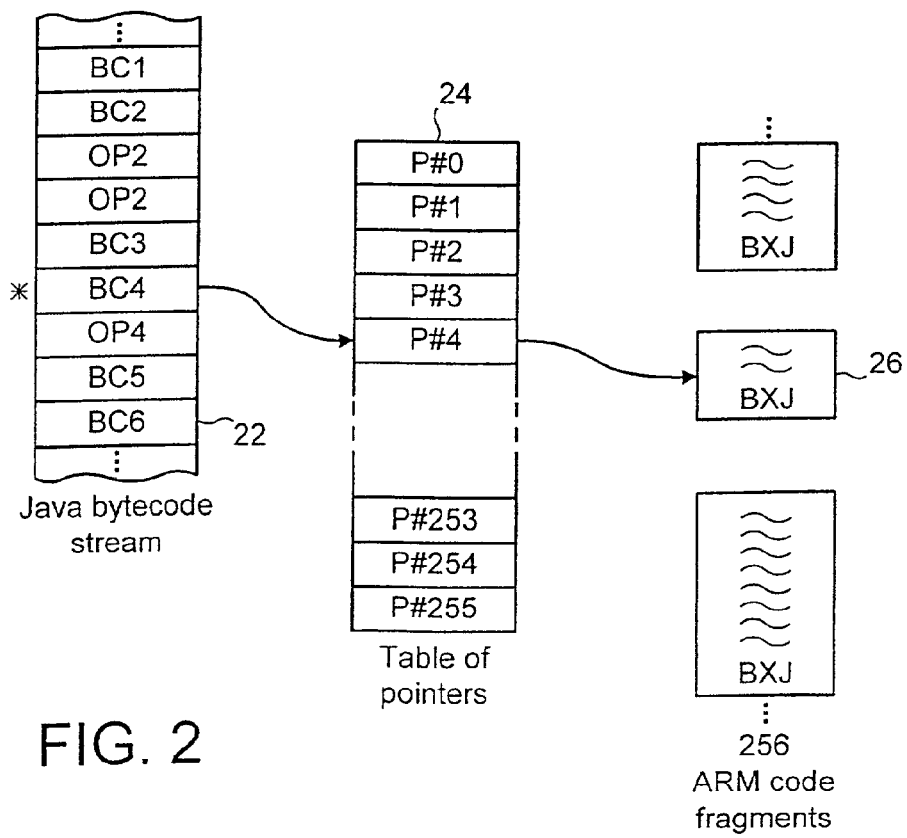
FIG. 2 schematically illustrates software instruction interpretation of bytecodes.

FIG. 2 schematically illustrates the action of the software instruction interpreter. A stream of Java bytecodes 22 represents a Java program. These Java bytecodes may be interspersed with operands. Thus, following execution of a given Java bytecode, the next Java bytecode to be executed may appear in the immediately following byte position, or may be several byte positions later if intervening operand bytes are present.

As shown in FIG. 2, a Java bytecode BC4 is encountered which is not supported by the bytecode translation hardware 6. This triggers an exception within the bytecode translation hardware 6 that causes a look up to be performed within a table of pointers 24 using the bytecode value BC4 as an index to read a pointer P#4 to a code fragment 26 that will perform the processing specified by the non-hardware supported bytecode BC4. A base address value of the table of pointers may also be stored in a register. The selected code fragment is then entered with R14 pointing to the unsupported bytecode BC4.

As illustrated, as there are 256 possible bytecode values, the table of pointers 24 contains 256 pointers. Similarly, up to 256 ARM native instruction code fragments are provided to perform the processing specified by all the possible Java bytecodes. (There can be less than 256 in cases where two bytecodes can use the same code fragment). The bytecode translation hardware 6 will typically provide hardware support for many of the simple Java bytecodes in order to increase processing speed, and in this case the corresponding code fragments within the software instruction interpreter will never be used except if forced, such as during debug or in other circumstances such as prefetch aborts as will be discussed later. However, since these will typically be the simpler and shorter code fragments, there is relatively little additional memory overhead incurred by providing them. Furthermore, this small additional memory overhead is more than compensated by the then generic nature of the software instruction interpreter and its ability to cope with all possible Java bytecodes in circumstances where the bytecode translation hardware is not present or is disabled.

Figure 3:
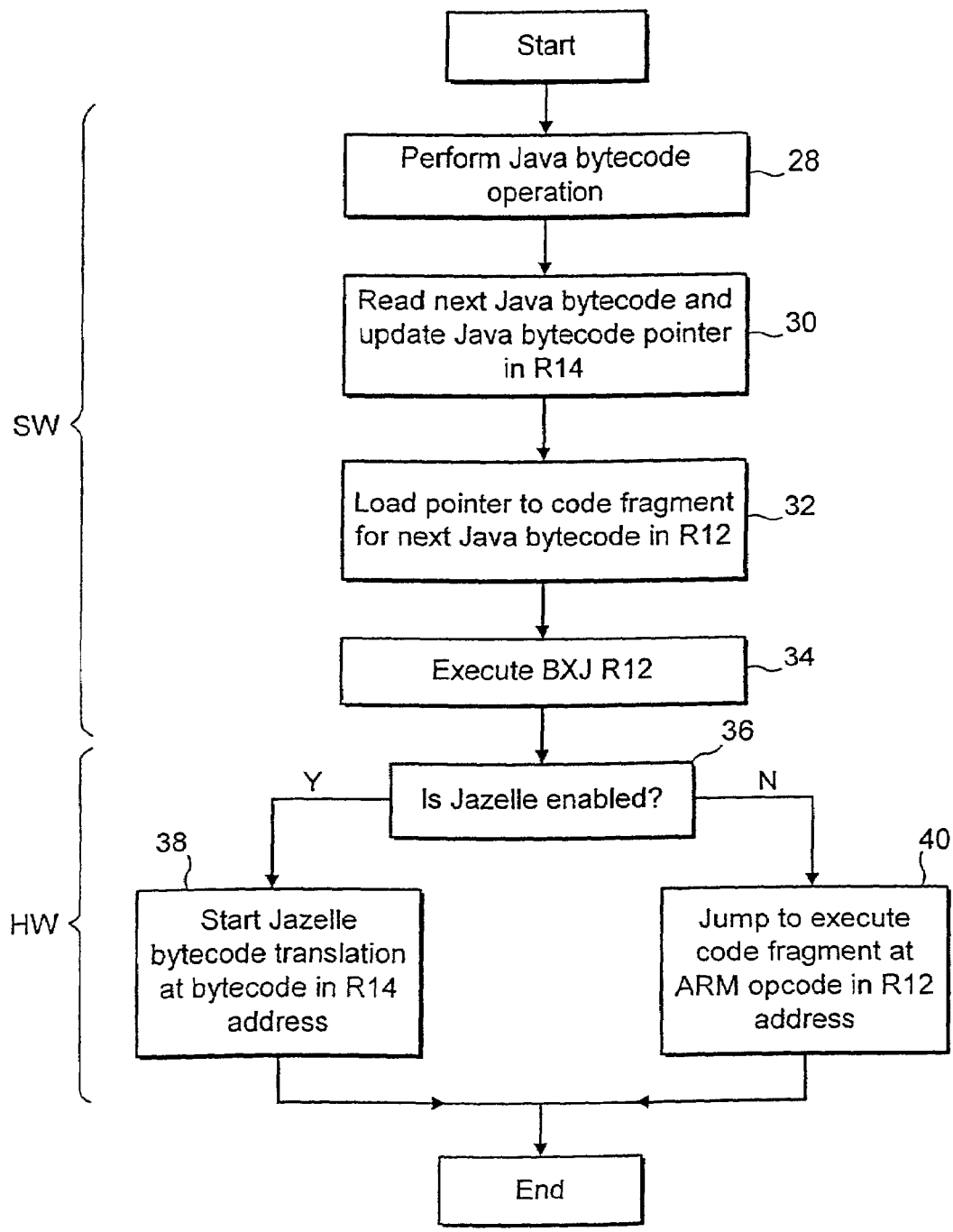
FIG. 3 is a flow diagram schematically representing the operation of a code fragment within the software instruction interpreter that ends with a sequence terminating instruction.

It will be seen that each of the code fragments 26 of FIG. 2 is terminated by a sequence terminating instruction BXJ. The action of this sequence terminating instruction BXJ varies depending upon the state of the data processing system 2 as will be illustrated in FIG. 3. FIG. 3 is a flow diagram illustrating in a highly schematic form the processing performed by a code fragment 26 within the software instruction interpreter. At step 28, the operation specified by the Java bytecode being interpreted is performed. At step 30, the next Java bytecode to be executed is read from the bytecode stream 22 and the bytecode pointer within the Java bytecode stream 22 corresponding to this next Java bytecode is stored within a register of the register bank 8, namely R14. Thus, for the Java bytecode BC4 of FIG. 2, the next Java bytecode will be BC5 and register R14 will be loaded with a pointer to the memory location of the Java bytecode BC5.

At step 32, the pointer within the table of pointers 24 corresponding to the next Java bytecode BC5 is read from the table of pointers 24 and stored within a register of the register bank 8, namely register R12.

It will be appreciated that FIG. 3 illustrates the steps 28, 30 and 32 being performed separately and sequentially. However, in accordance with known programming techniques the processing of steps 30 and 32 may be conveniently interleaved within the processing of step 28 to take advantage of otherwise wasted processing opportunities (cycles) within the processing of step 28. Thus, the processing of steps 30 and 32 can be provided with relatively little execution speed overhead.

Step 34 executes the sequence terminating instruction BXJ with register R14 specified as an operand.

Prior to executing the BXJ instruction at step 34, the state of the system has been set up with the pointer to the next Java bytecode within the Java bytecode stream 22 being stored within register R14 and the pointer to the code fragment corresponding to that next Java bytecode being stored within the register R12. The choice of the particular registers could be varied and none, one or both specified as operands to the sequence terminating instruction or predetermined and defined by the architecture.

Steps 28, 30, 32 and 34 are predominantly software steps. The steps subsequent to step 34 in FIG. 3 are predominantly hardware steps and take place without separate identifiable program instructions. At step 36, the hardware detects whether or not the bytecode translation hardware 6 is active. It does this by reading the register flag values for the presence and the enablement of the bytecode translation hardware 6. Other mechanisms for determining the presence of active bytecode translation hardware 6 are also possible.

If bytecode translation hardware 6 is present and enabled, then processing proceeds to step 38 at which control is passed to the bytecode translation hardware 6 together with the contents of the register R14 specifying the bytecode pointer to a bytecode within the bytecode stream 22 which the bytecode translation hardware 6 should attempt to execute as its next bytecode. The action of the code fragment 26 illustrated then terminates.

Alternatively, if the determination at step 36 is that there is no bytecode translation hardware 6 or the bytecode translation hardware is disabled, then processing proceeds to step 40 at which a jump within the native ARM instruction code is made to commence execution of the code fragment within the software instruction interpreter that is pointed to by the address stored within register R12. Thus, rapid execution of the next code fragment is initiated yielding an advantage in processing speed.

Figures 4, 5:
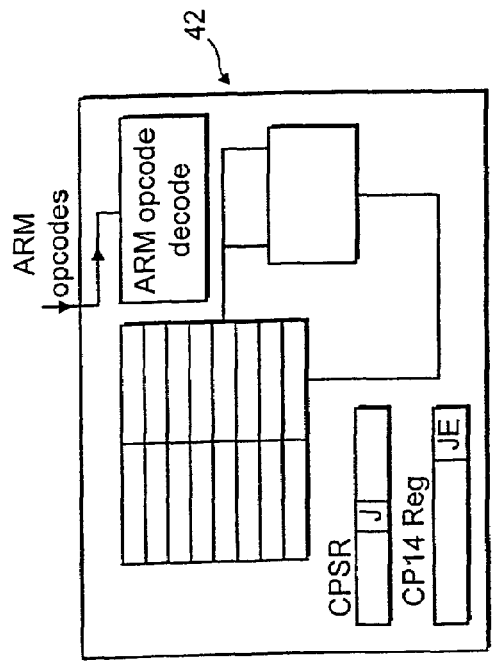
FIG. 4 is an example of a code fragment executed in place of a bytecode.
FIG. 5 illustrates an example data processing system that does not have hardware bytecode execution support.

FIG. 4 illustrates a particular code fragment in more detail. This particular example is an integer addition Java bytecode, whose mnemonic is iadd.

The first ARM native instruction uses the bytecode pointer in register R14 incremented by one to read the next bytecode value (an integer add instruction does not have any following bytecode operands and so the next bytecode will immediately follow the current bytecode). The bytecode pointer in register R14 is also updated with the incremented value.

The second and third instructions serve to retrieve from the stack the two integer operand values to be added.

The fourth instruction takes advantage of what would otherwise be a wasted processing cycle due to register interlocking on register R0 to retrieve the address value of the code fragment for the next bytecode stored in register R4 and store this address within register R12. A register Rexc is used to store a base pointer to the start of the table of pointers 24.

The fifth instruction performs the integer add specified by the Java bytecode.

The sixth instruction stores the result of the Java bytecode back to the stack.

The final instruction is the sequence terminating instruction BXJ specified with the operand R12. The register R12 stores the address of the ARM code fragment that will be needed to software interpret the next Java bytecode should software interpretation be required. The execution of the BXJ instruction determines whether or not there is present enabled bytecode translation hardware 6. If this is present, then control passes to this bytecode translation hardware 6 together with the operand stored in register R14 specifying the next bytecode address. If active bytecode translation hardware 6 is not present, then execution of the code fragment for the next bytecode as pointed to by the address value within register R12 is started.

FIG. 5 schematically illustrates a data processing system 42 similar to that of FIG. 1 except that in this case no bytecode translation hardware 6 is provided. In this system flag 21 always indicates that ARM instructions are being executed and attempts to enter Java bytecode execution with a BXJ instruction are always treated as though the bytecode translation hardware 6 were disabled, with flag 20 being ignored.

Figure 6:
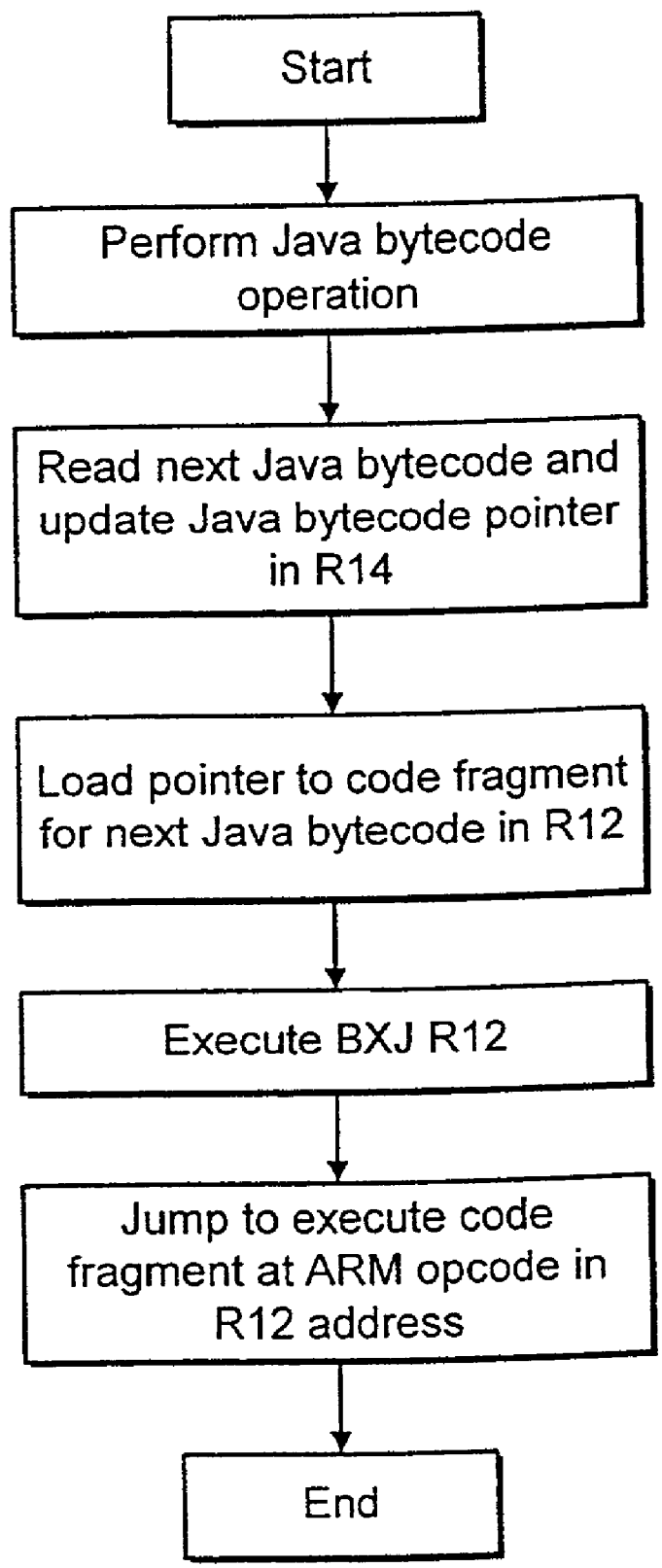
FIG. 6 is a flow diagram illustrating the software instruction interpreter action when operating with the system of FIG. 5.

FIG. 6 illustrates a flow diagram of the processing performed by the system 42 in executing a Java bytecode. This is similar to the processing of FIG. 3 in that the same software interpreter code is being used except that in this case when the sequence terminating instruction BXJ is executed, there is never the possibility of hardware bytecode support and accordingly processing always continues with a jump to execute the code fragment pointed to by R12 as being the code fragment for the next Java bytecode.

It will be appreciated that the software instruction interpreter in this case is provided as ARM native instructions. The software instruction interpreter (and other support code) may be provided as a separate computer program product in its own right. This computer program product may be distributed via a recording medium, such as a floppy disk or a CD or might be dynamically downloaded via a network link. In the context of embedded processing applications, to which the present invention is particularly well suited, the software instruction interpreter may provided as firmware within a read only memory or some other non-volatile program storage device within an embedded system.

FIG. 7 illustrates the relationship between Java bytecodes and the processing operations that they specify. As will be seen from FIG. 7, the 8-bit Java bytecodes provide 256 possible different bytecode values. The first 203 of these Java bytecodes are subject to fixed bindings as specified within the Java standard, to corresponding processing operations, such as iadd discussed previously. The last two Java bytecodes, namely 254 and 255, are described in The Java Virtual Machine Specification as being implementation defined. Therefore a Java implementation is fee to assign fixed bindings to these bytecodes. Alternatively a Java implementation may choose to treat these as having programmable bindings. Jazelle specifies fixed bindings for these bytecodes. Between bytecode values 203 and 253 inclusive, programmable bindings may be specified as desired by a user. These are typically used to provide bindings between bytecodes and processing operations, such as quick form bytecodes that are resolved during run time (see The Java Virtual Machine Specification, authors Tim Lindholm and Frank Yellin, publishers Addison Wesley, ISBN 0-201-63452-X).

It will be appreciated from FIG. 7 that whilst hardware accelerated interpretation techniques are well suited to dealing with the fixed bindings, these techniques are less well suited to dealing with the programmable bindings. Whilst it would be possible to treat all of the programmable bindings using software interpretation techniques, such as interpreting of the relevant bytecodes to be represented by corresponding code fragments, this would be slow for what in some cases can be performance critical bytecodes.

Figure 8:
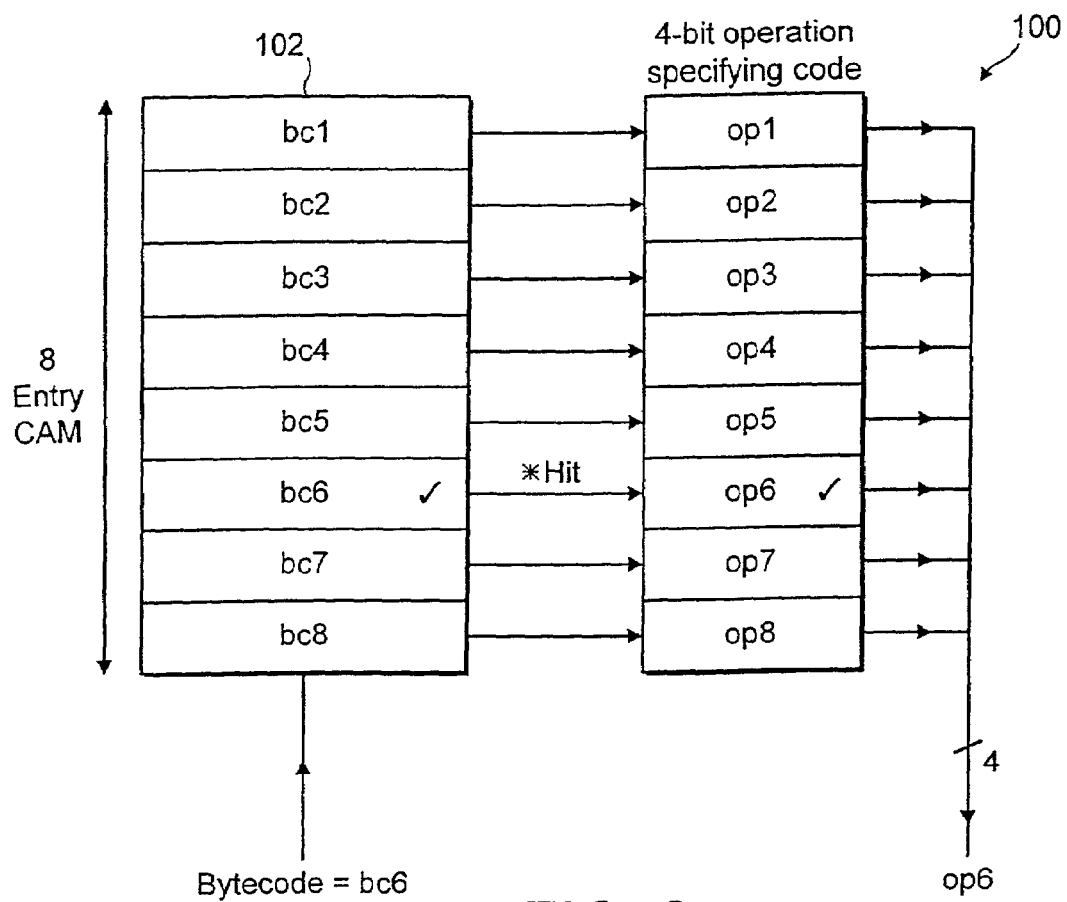
FIG. 8 illustrates a programmable translation table in the form of a content addressable memory.

FIG. 8 illustrates one form of programmable translation table. This programmable translation table 100 is in the form of a content addressable memory. A bytecode to be translated is input to a CAM lookup array 102. If this array 102 contains a matching bytecode entry, then a hit is generated that causes a corresponding operation specifying value to be output, i.e.

if there is a matching bytecode entry in the CAM table, then the hardware uses the operation specifying code to determine an operation to be performed in hardware, performs that operation and moves on to the next bytecode;

if there is not a matching bytecode entry in the CAM table, then the bytecode is treated as non-hardware supported and its code fragment is called.

In this example, the operation specifying values are 4-bit values and the CAM entry that has given rise to the hit corresponds to bytecode bc6. As will be understood from FIG. 7, all of the bytecodes that may be subject to such programmable translation have their most significant two bits as "1" and accordingly only the least significant 6 bits of the bytecode need be input to the array 102.

The programmable translation table 100 in this example has eight entries. The number of entries present may be varied depending upon the amount of hardware resources that it is desired to dedicate to this task. In some examples only four entries may be provided, whilst in other ten entries may be appropriate. It may also be possible to provide an entry for every possible programmable binding bytecode.

It will be appreciated that if the programmable mapping resources available are first filled with the most critical translation, then less critical translations may be subject to software interpretation. The provision of the software interpreter in combination with the programmable translation table allows the configuration of the system and the programming of the table to be made without it being necessary to know how many table entries are available since if the table overflows, then the required translations will be trapped and performed by the software interpreter.

Figure 9:
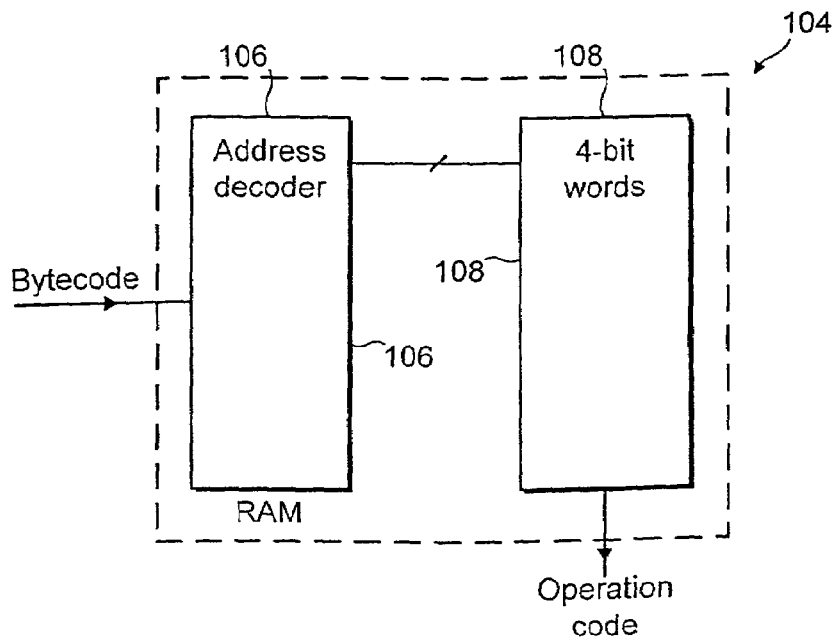
FIG. 9 illustrates a programmable translation table in the form of a random access memory.

FIG. 9 illustrates a second example programmable translation table 104. In this example the translation table is provided in the form of a random access memory with the bytecode to be translated to be input to a decoder 106 which treats the bytecode as an address to an RAM array 108 of 4-bit words each representing an operation specifying code. In this case an operation specifying code will always be found for the bytecode. As a result, this type of table uses one extra operation specifying code, which specifies "call the code fragment for this bytecode".

Figure 10:
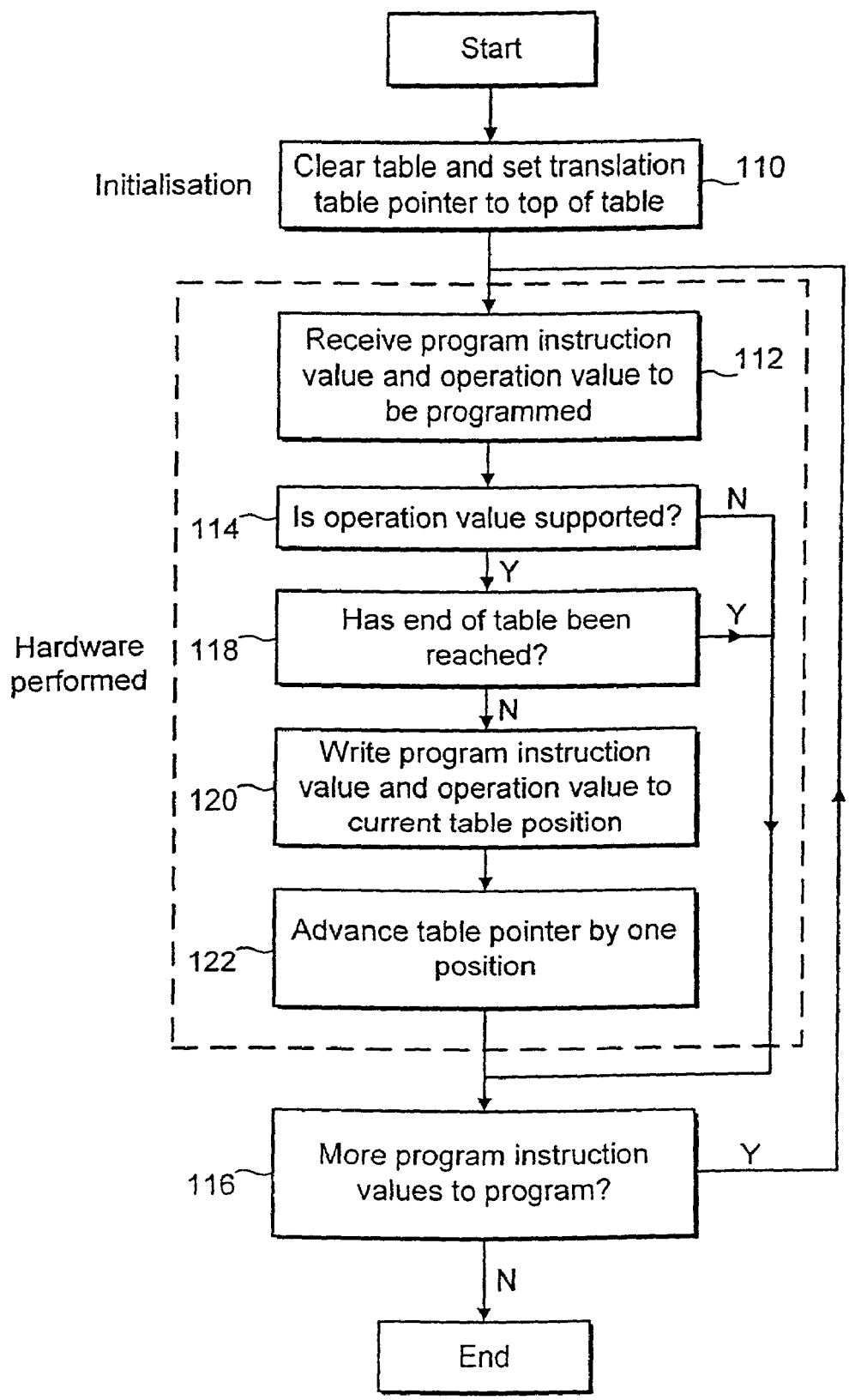
FIG. 10 is a flow diagram schematically illustrating the initialising and programming of a programmable translation table.

FIG. 10 is a schematic flow diagram illustrating the initialisation and configuration of a programmable mapping hardware interpreter having the form of the example of FIG. 8. In practice, different portions of the actions illustrated in this flow diagram are respectively performed by software initialisation instructions and the hardware responding to those instructions.

At step 110, a table initialisation instruction is executed that serves to clear all existing table entries and set a pointer to the top entry in the table. Subsequent to this, initialisation code may execute to load mappings into the translation table using program instructions such as coprocessor register loads. The different forms of these table loading instructions can vary depending upon the particular circumstances and environment. The programmable mapping hardware interpreter system responds to these instructions by receiving a program instruction value, such as a Java bytecode, and the operation value to be associated with this at step 112. At step 114, unsupported operation trap hardware checks that the operation value being programmed is one that is supported by that programmable mapping hardware interpreter. Different programmable mapping hardware interpreters may support different sets of operation values and so may be provided with their own specific trap hardware. The trap hardware can be relatively simple if a particular system for instance knows that it supports operation values 0, 1, 2, 3, 4, 5, 6, 7, 8, 10, but not 9. A hardware comparator at step 114 can compare the operation value for equality with a value of 9 and reject the programming by diverting processing to step 116 if a 9 detected.

Assuming that step 114 indicates that the operation value is supported, then step 118 checks to determine whether or not the end of the programmable mapping table has already been reached. If the programmable mapping table is already full, then processing again proceeds to step 116 without a new mapping being added. The provision of step 118 within the hardware means that the support code may seek to program the programmable mapping table without a knowledge of how many entries are available with the hardware merely rejecting overflowing entries. Thus, the programmer should place the most critical mappings at the start of the table programming to ensure that these take up slots that are available. The avoidance of the need for the support code to know how many programmable slots are available means that a single set of support code may operate upon multiple platforms.

Assuming the table has a vacant entry, then the new mapping is written into that entry at step 120 and the table pointer then advanced at step 122.

At step 116, the system tests for more program instruction values to be programmed into the programmable mapping table. Step 116 is typically a software step with the support code seeking to program as many mappings as it wishes during initialisation of the system.

In the case of initialising a RAM table as shown in FIG. 9, the process described above in relation to FIG. 10 may be followed subject to the following modifications:

that in step 110, the table is cleared by setting all table entries in array 108 of FIG. 9 to "call the bytecode fragment for this bytecode" rather than by setting the array 102 in FIG. 8 so that each entry does not match any bytecode;

that in step 110, there is no translation table pointer to be initialised;

that step 118 does not exist, because there is no translation table pointer;

that step 120 becomes "write operation value to table entry indicated by program instruction value"; and that step 122 does not exist, since there is no translation table pointer.

Figure 11:
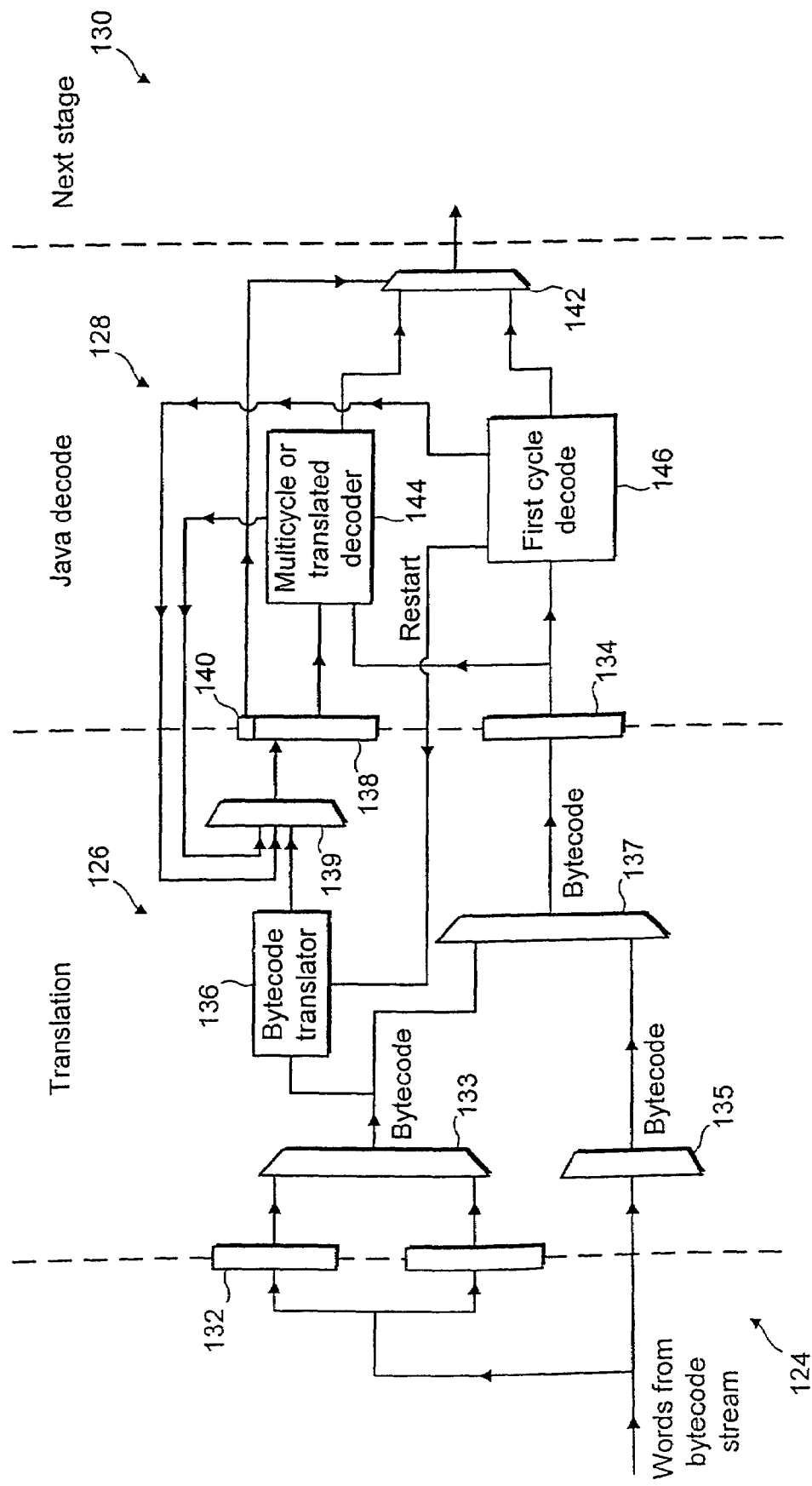
FIG. 11 is a diagram schematically illustrating a portion of the processing pipeline within a system that performs Java bytecode interpretation.

FIG. 11 illustrates a portion of a processing pipeline that may be used for Java bytecode interpretation. The processing pipeline 124 includes a translation stage 126 and a Java decode stage 128. A subsequent stage 130 could take a variety of different forms depending upon the particular implementation.

Words from the Java bytecode stream are loaded alternately into the two halves of the swing buffer 132. Normally, multiplexor 133 selects the current bytecode and its operands from swing buffer 132 and delivers it via multiplexor 137 to latch 134. If swing buffer 132 is empty because the pipeline has been flushed or for some other reason, then multiplexor 135 selects the correct bytecode directly from the incoming word of the Java bytecode stream and delivers it to latch 134.

The first cycle of decode for a bytecode is done by the first cycle decoder 146, acting on the bytecode in latch 134. In order to allow for cases where a hardware-supported bytecode has operands, further multiplexors select the operands from swing buffer 132 and deliver them to the first cycle decoder 146. These multiplexors are not shown in the figure, and are similar to multiplexors 133. Typically, the first cycle decoder 146 has more relaxed timing requirements for the operand inputs than for the bytecode input, so that a bypass path similar to that provided by multiplexors 135 and 137 and latch 134 is not required for the operands.

If the swing buffer 132 contains insufficient operand bytes for the bytecode in latch 134, then the first cycle decoder 146 stalls until sufficient operand bytes are available.

The output of the first cycle decoder 146 is an ARM instruction (or set of processor core controlling signals representing an ARM instruction) which is passed to the subsequent pipeline stage 130 via the multiplexor 142. A second output is an operation specifying code which is written to latch 138 via multiplexor 139. The operation specifying code contains a bit 140 which specifies whether this is a single-cycle bytecode.

On the next cycle, the following bytecode is decoded by the first cycle decoder 146 as previously described. If bit 140 indicates a single-cycle bytecode, then that bytecode is decoded and controls the subsequent pipeline stage 130 as previously described.

If bit 140 instead indicates a multicycle bytecode, then the first cycle decoder 146 is stalled and the multicycle or translated decoder 144 decodes the operation specifying code in latch 138 to produce an ARM instruction (or set of processor core controlling signals representing an ARM instruction), which the multiplexor 142 passes to the subsequent pipeline stage 130 instead of the corresponding output of the first cycle decoder 146. The multicycle or translated decoder also produces a further operation specifying code which is written to latch 138 via multiplexor 139, again instead of the corresponding output of the first cycle decoder 146. This further operation specifying code also contains a bit 140 which specifies whether this is the last ARM instruction to be produced for the multicycle bytecode. The multicycle or translated decoder 144 continues to be generate further ARM instructions as described above until bit 140 indicates that the last ARM instruction has been produced, and then the first cycle decoder 146 ceases to be stalled and produces the first ARM instruction for the following bytecode.

The process described above is modified in three ways when the bytecode in latch 134 needs to be translated. First, the bytecode is extracted from the swing buffer 132 by the multiplexor 133 and translated by the bytecode translator 136, producing an operation specifying code which is written to latch 138 via multiplexor 139. This operation specifying code has bit 140 set to indicate that the last ARM instruction has not been produced for the current bytecode, so that multiplexor 142 and multiplexor 139 will select the outputs of the multicycle or translated decoder 144 in place of thoseáof the first cycle decoder 146 on the first cycle of the translated bytecode.

Secondly, the multicycle or translated decoder 144 generates all of the ARM instructions to be passed to the subsequent pipeline stage 130 and their corresponding further operation specifying codes to be written back into latch 138, rather than only generating those after the first cycle as it would for a bytecode that does not require translation.

Thirdly, if the bytecode was written directly to latch 134 via multiplexor 135 and so was not present in the swing buffer 132 and could not have been translated by the bytecode translator 136 on the previous cycle, then the first cycle decoder 146 signals the bytecode translator 136 that it must restart and stalls for a cycle. This ensures that when the first cycle decoder 146 ceases to stall, latch 138 holds a valid operation specifying code for the translated bytecode.

It will be seen from FIG. 11 that the provision of a translation pipeline stage enables the processing required by the programmable translation step to effectively be hidden or folded into the pipeline since the buffered instructions may be translated in advance and streamed into the rest of the pipeline as required.

It will be seen in FIG. 11 that in this example embodiment the fixed mapping hardware interpreter can be considered to be formed principally by the first cycle decoder 146 and the multicycle or translated decoder 144 operating in the mode in which it decodes multicycle bytecodes that have been subject to first cycle decoding by the first cycle decoder 146. The programmable mapping hardware interpreter in this example can be considered to be formed by the bytecode translator 136 and the multicycle or translated decoder 144 in this instance operating subsequent to translation of a programmable bytecode. The fixed mapping hardware interpreter and the programmable mapping hardware interpreter may be provided in a wide variety of different ways and may share significant common hardware whilst retaining their different functions from an abstract point of view. All these different possibilities are encompassed within the present described techniques.

Figures 12, 14:
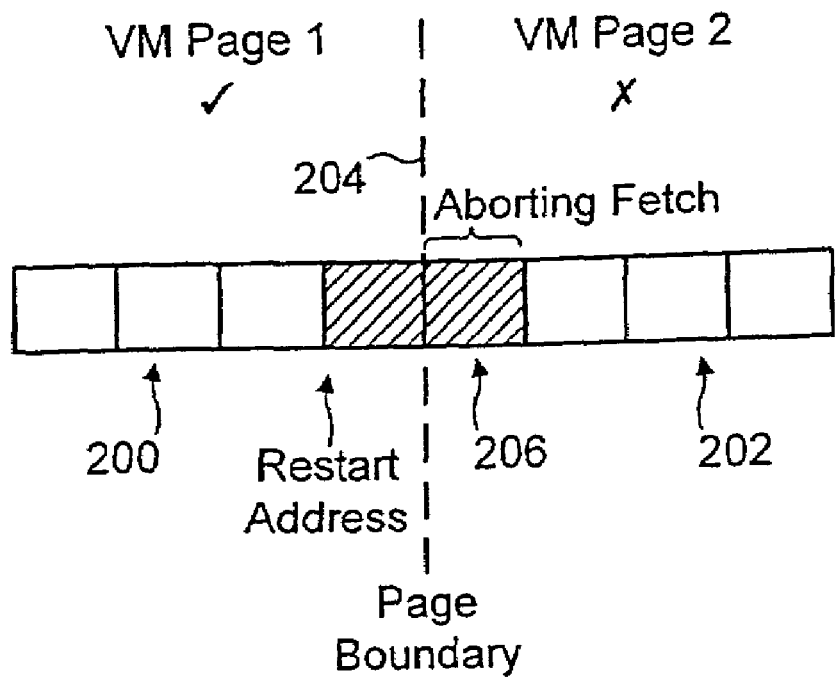
FIG. 12 schematically illustrates a variable length instruction spanning two instruction words and two virtual memory pages.
FIG. 14 gives a logical expression that is one way of specifying how a prefetch abort of the type illustrated in FIG. 12 may be detected.

FIG. 12 illustrates two 32-bit instruction words 200, 202 that span a virtual memory page boundary 204. This may be a 1 kB page boundary, although other page sizes are possible.

The first instruction word 200 is within a virtual memory page that is properly mapped within the virtual memory system. The second instruction word 202 lies within a virtual memory page that is not at this stage mapped within the virtual memory system. Accordingly, a two-byte variable length instruction 206 that has its first byte within the instruction word 200 and its second byte within the instruction word 202 will have a prefetch abort associated with its second byte. Conventional prefetch abort handling mechanisms that, for example, only support instruction word aligned instructions may not be able to deal with this situation and could, for example, seek to examine and repair the fetching of the instruction word 200 containing the first byte of the variable length instruction 206 rather than focusing on the instruction word 202 containing the second byte of that variable length instruction word 206 that actually led to the abort.

Figure 13:
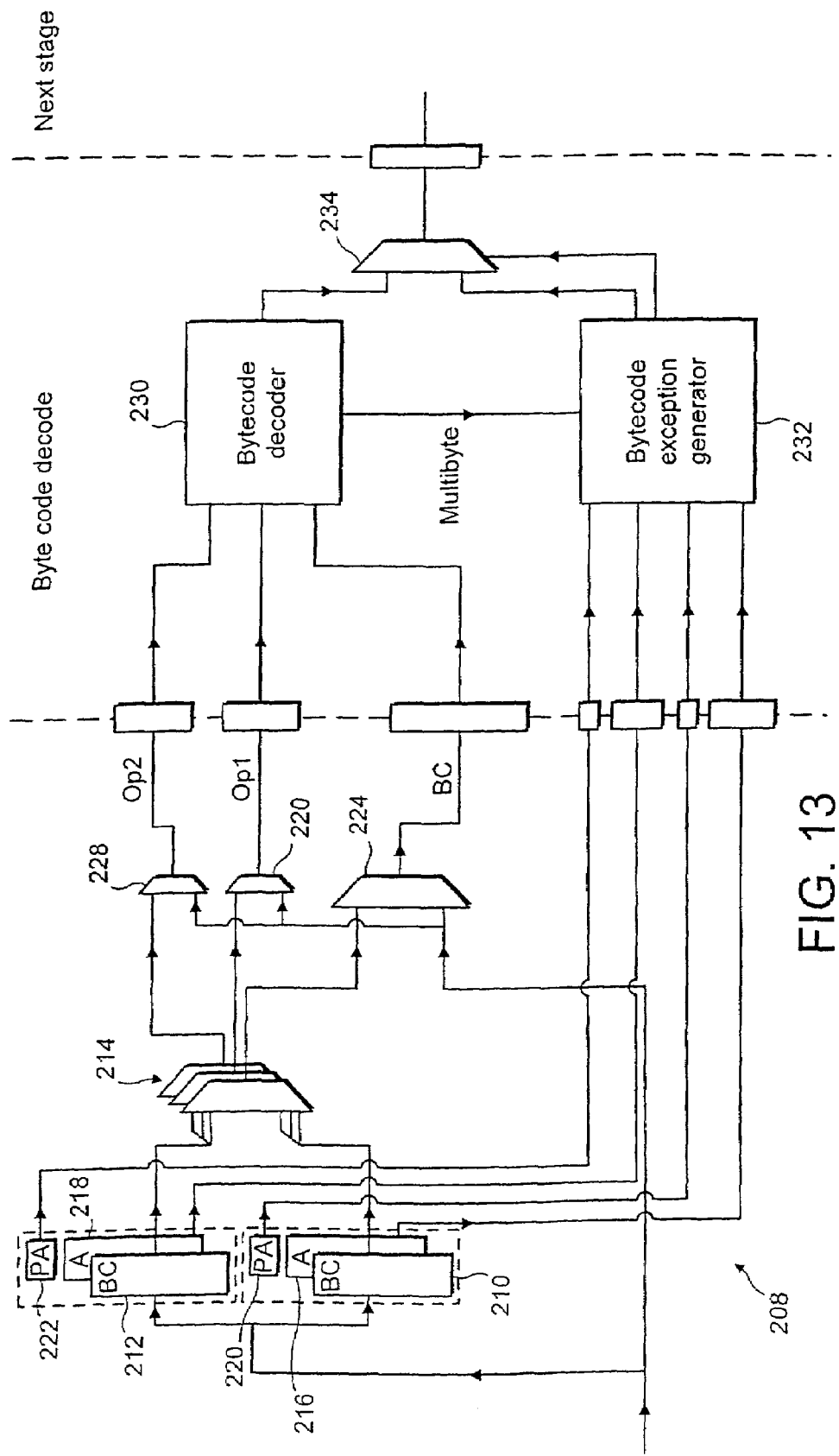
FIG. 13 schematically illustrates a portion of a data processing system pipeline including a mechanism for dealing with prefetch aborts of the type illustrated in FIG. 12.

FIG. 13 illustrates a part of an instruction pipeline 208 within a data processing system for processing Java bytecodes that includes a mechanism for dealing with prefetch aborts of the type illustrated in FIG. 12. An instruction buffer includes two instruction word registers 210 and 212 that each store a 32-bit instruction word. The Java bytecodes are each 8-bits in length, accompanied by zero or more operand values. A group of multiplexers 214 serve to select the appropriate bytes from within the instruction word registers 210 and 212 depending upon the current Java bytecode pointer position indicating the address of the first byte of the current Java bytecode instruction to be decoded.

Associated with each of the instruction word registers 210 and 212 are respective instruction address registers 216, 218 and prefetch abort flag registers 220 and 222. These associated registers respectively store the address of the instruction word to which they relate and whether or not a prefetch abort occurred when that instruction word was fetched from the memory system. This information is passed along the pipeline together with the instruction word itself as this information is typically needed further down the pipeline.

Multiplexers 224, 226 and 228 allow the input buffer arrangement to be bypassed if desired. This type of operation is discussed above. It will be appreciated that the instruction pipeline 208 does not, for the sake of clarity, show all of the features of the previously discussed instruction pipeline. Similarly, the previously discussed instruction pipeline does not show all of the features of the instruction pipeline 208. In practice a system may be provided with a combination of the features shown in the two illustrated instruction pipelines.

Within a bytecode decoding stage of the instruction pipeline 208, a bytecode decoder 230 is responsive to at least a Java bytecode from multiplexer 224, and optionally one or two operand bytes from multiplexers 226 and 228, to generate a mapped instruction(s) or corresponding control signals for passing to further stages in the pipeline to carry out processing corresponding to the decoded Java bytecode.

If a prefetch abort of the type illustrated in FIG. 12 has occurred, then whilst the Java bytecode itself may be valid, the operand values following it will not be valid and correct operation will not occur unless the prefetch abort is repaired. A bytecode exception generator 232 is responsive to the instruction word addresses from the registers 216 and 218 as well as the prefetch abort flags from the registers 220 and 222 to detect the occurrence of the type of situation illustrated in FIG. 12. If the bytecode exception generator 232 detects such a situation, then it forces a multiplexer 234 to issue an instruction or control signals to the subsequent stages as generated by the bytecode exception generator itself rather than as generated by the bytecode decoder 230. The bytecode exception generator 232 responds to the detection of the prefetch abort situation of FIG. 12 by triggering the execution of an ARM 32-bit code fragment emulating the Java bytecode being aborted rather than allowing the hardware to interpret that Java bytecode. Thus, the variable length Java instruction 206 that was subject to the prefetch abort will not itself be executed, but will instead be replaced by a sequence of 32-bit ARM instructions. The ARM instructions used to emulate the instruction are likely to be subject to data aborts when loading one or more of the operand bytes, with these data aborts occurring for the same reasons that prefetch aborts occurred when those bytes were originally fetched as part of the second instruction word 202, and it is also possible that further prefetch and data aborts will occur during execution of the ARM 32-bit code fragment. All of these aborts occur during ARM instruction execution and so will be handled correctly by existing abort exception handler routines.

In this way the prefetch abort that occurred upon fetching the bytecodes is suppressed (i.e. not passed through to the ARM core). Instead an ARM instruction sequence is executed and any aborts that occur with these ARM instructions will be dealt with using the existing mechanisms thus stepping over the bytecode that had a problem. After execution of the emulating ARM instructions used to replace the bytecode with an abort, execution of bytecodes may be resumed.

If the bytecode itself suffers a prefetch abort, then an ARM instruction marked with a prefetch abort is passed to the rest of the ARM pipeline. If and when it reaches the Execute stage of the pipeline, it will cause a prefetch abort exception to occur: this is a completely standard way of handling prefetch aborts on ARM instructions.

If the bytecode does not suffer a prefetch abort, but one or more of its operands do, as shown in FIG. 12, then the software code fragment for that bytecode is called. Any ARM instructions passed to the rest of the ARM pipeline to cause the code fragment to be called will not be marked with a prefetch abort, and so will execute normally if and when they reach the Execute stage of the pipeline.

FIG. 14 illustrates a logical expression of the type that may be used by the bytecode exception generator 232 to detect the type of situation illustrated in FIG. 12. Denote by "Half1" whichever half of the swing buffer in FIG. 13 (blocks 210, 216, 220 form one half, while blocks 212, 218, 222 form the other half, as denoted by the dashed lines around these elements in FIG. 13) currently holds the first instruction word (200 in FIG. 12), and by "Half2" the other half of the swing buffer, which holds the second instruction word (202 in FIG. 12). Let PA(Half1) mean the contents of whichever of blocks 220 and 222 is in Half1, and similarly for Half2.

Then the indicators of the situation described in FIG. 12 are that PA(Half1) is false, PA(Half2) is true, and the bytecode plus its operands span the boundary between the two swing buffer halves. (The fact that there is a page boundary marked there is simply because that is normally a requirement for it to be possible for the two PA( ) values to differ.)

In preferred designs such as ones where the swing buffer halves each store a word, and hardware-supported bytecodes are limited to a maximum of 2 operands, the formula for determining whether the bytecode plus its operands span the boundary is:

((number of operands=1) AND (bcaddr[1:0]=11))

OR ((number of operands=2) AND (bcaddr[1]=1))

where bcaddr is the address of the bytecode. This allows the logical expression shown in FIG. 14 to be derived.

Other techniques for identifying a prefetch abort may be used, such as a variable length instruction starting within a predetermined distance of a memory page boundary.

Figure 15:
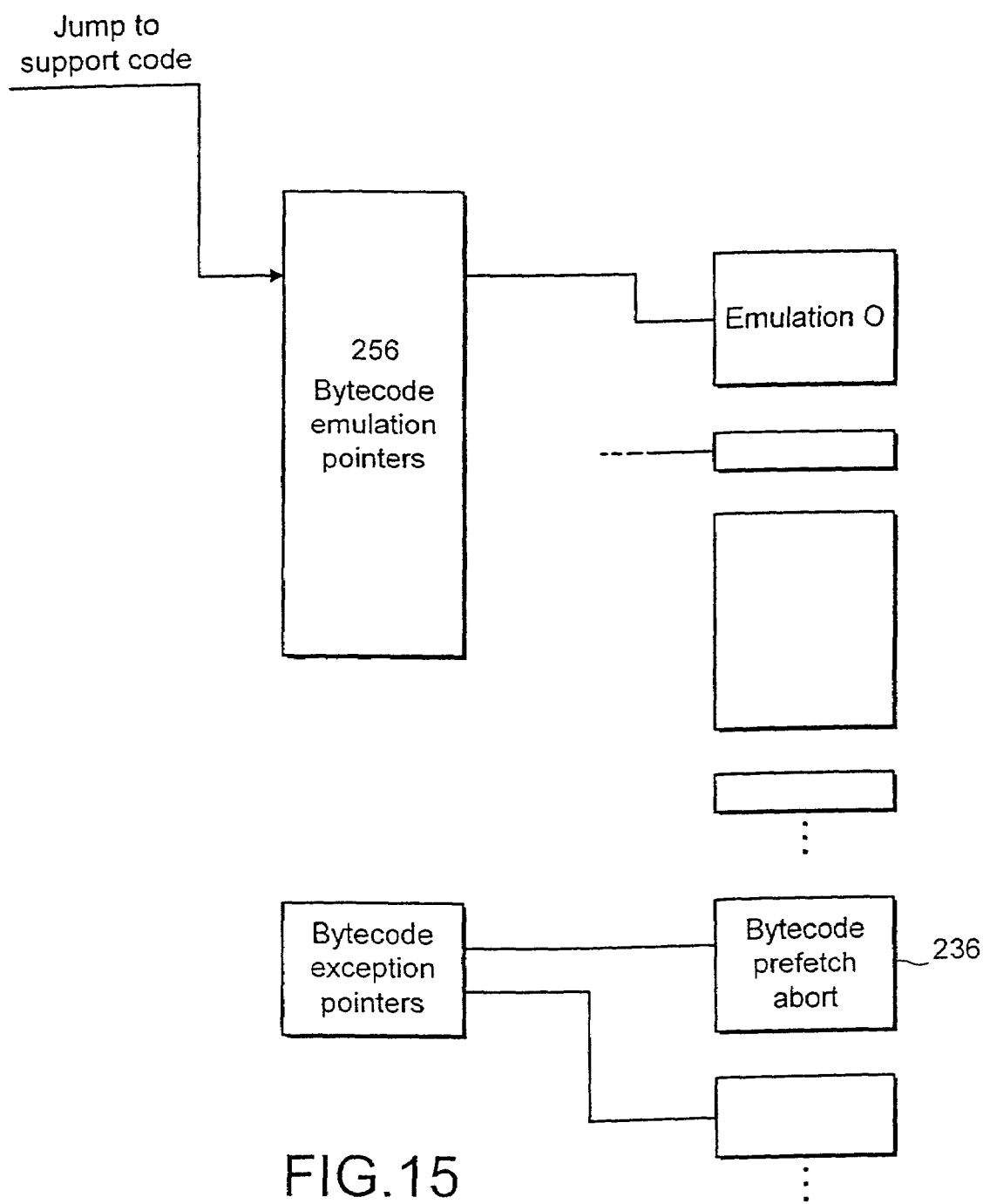
FIG. 15 schematically illustrates an arrangement of support code for abort handling and instruction emulation.

FIG. 15 schematically illustrates the structure of the support code associated with the Java bytecode interpretation. This is similar to the previously discussed figure, but in this case illustrates the inclusion of the pointers to bytecode exception handling code fragments that are triggered by bytecode exception events. Thus, each of the Java bytecodes has an associated ARM code fragment that emulates its operation. Furthermore, each of the bytecode exceptions that may occur has an associated portion of ARM exception handling code. In the case illustrated, a bytecode prefetch abort handling routine 236 is provided to be triggered upon detection of the above discussed type of prefetch abort by the bytecode exception generator 232. This abort handling code 236 acts by identifying the bytecode at the start of the variable length instruction that gave rise to its triggering, and then invoking the corresponding emulation code fragment for that bytecode within the collection of code fragments.

Figure 16:
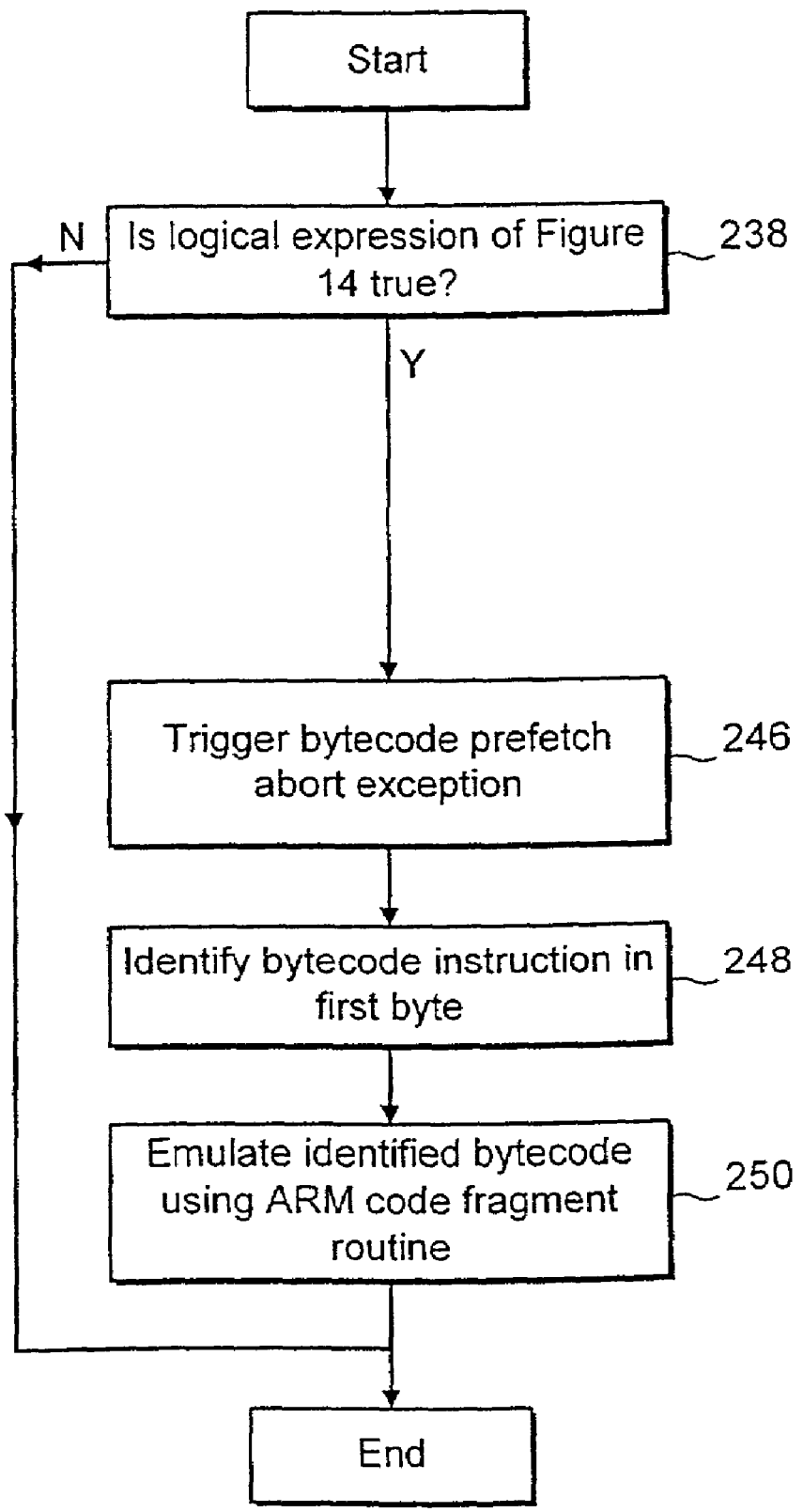
FIG. 16 is a flow diagram schematically illustrating the processing performed to deal with prefetch aborts of variable length byte code instructions.

FIG. 16 is a flow diagram schematically illustrating the operation of the bytecode exception generator 232 and the subsequent processing. Step 238 serves to determine whether or not the expression of FIG. 14 is true. If the expression is false then this process ends.

If step 238 has indicated the type of situation illustrated in FIG. 12, then step 246 is executed which triggers a bytecode prefetch abort exception to be initiated by the bytecode exception generator 232. The bytecode exception generator 232 may simply trigger execution of the ARM code bytecode prefetch abort handler 236. The abort handler 236 serves at step 248 to identify the bytecode which starts the variable length instruction and then at step 250 triggers execution of the code fragment of ARM instructions that emulate that identified bytecode.

The above described mechanism for dealing with prefetch aborts works well for situations in which there are four or fewer operands (i.e. five or fewer bytes in total), otherwise it would be possible for a bytecode and its operands to overflow the second buffer. In practice, the bytecodes for which it is preferred to provide a hardware acceleration mechanism all have 0, 1 or 2 operands with the remainder of bytecodes being handled in software in all cases, principally due to their complexity.

Figure 17:
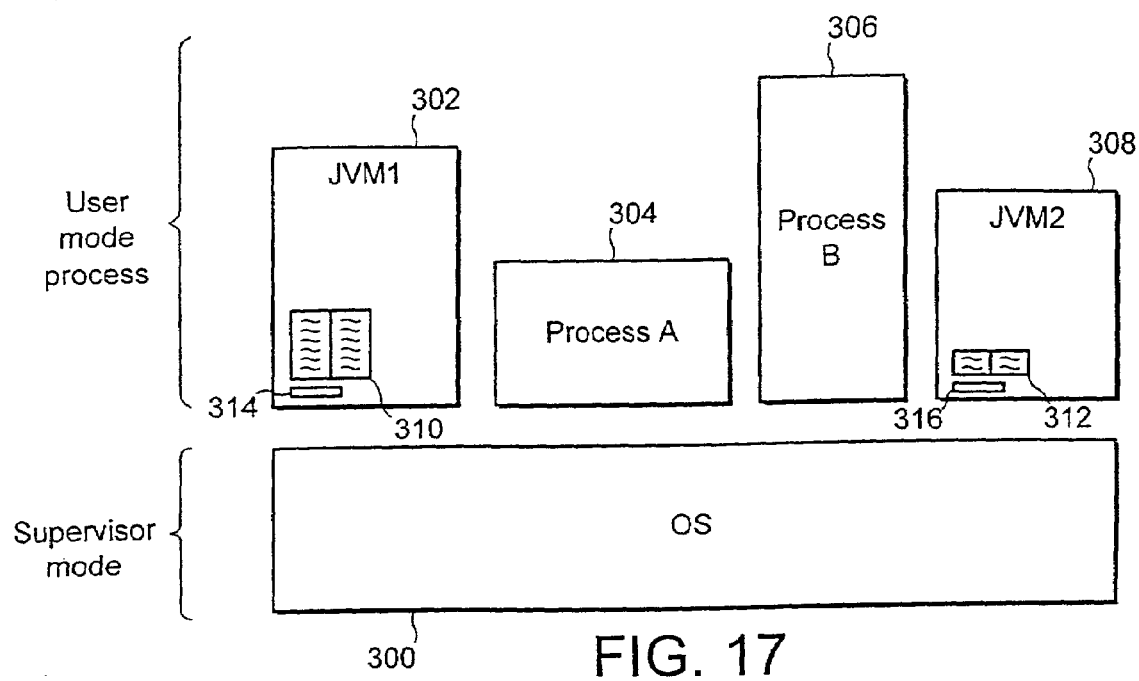
FIG. 17 illustrates the relationship between an operating system and various processes controlled by that operating system.

FIG. 17 illustrates an operating system 300 for controlling a plurality of user mode processes 302, 304, 306 and 308. The operating system 300 operates in a supervisor mode and the other processes 302, 304, 306 and 308 operate in a user mode having fewer access rights to configuration control parameters of the system than does the operating system 300 operating in supervisor mode.

As illustrated in FIG. 17 the processes 302 and 308 respectively relate to different Java Virtual Machines. Each of these Java Virtual Machines 302, 308 has its own configuration data formed of bytecode translation mapping data 310, 312 and configuration register data 314, 316. In practice, it will be appreciated that a single set of Java acceleration hardware is provided for executing both of the processes 302, 308, but when these different processes are using the Java acceleration hardware they each require it to be configured with their associated configuration data 310, 312, 314, 316. Thus, when the operating system 300 switches execution to a process using the Java acceleration hardware that is different from the previous process that used that hardware, then the Java acceleration hardware should be reinitialised and reconfigured. The operating system 300 does not do this re-initialisation and reconfiguration of the Java acceleration hardware itself, but indicates that it should be done by setting a configuration invalid indicator associated with the Java acceleration hardware to an invalid state.

Figure 18:
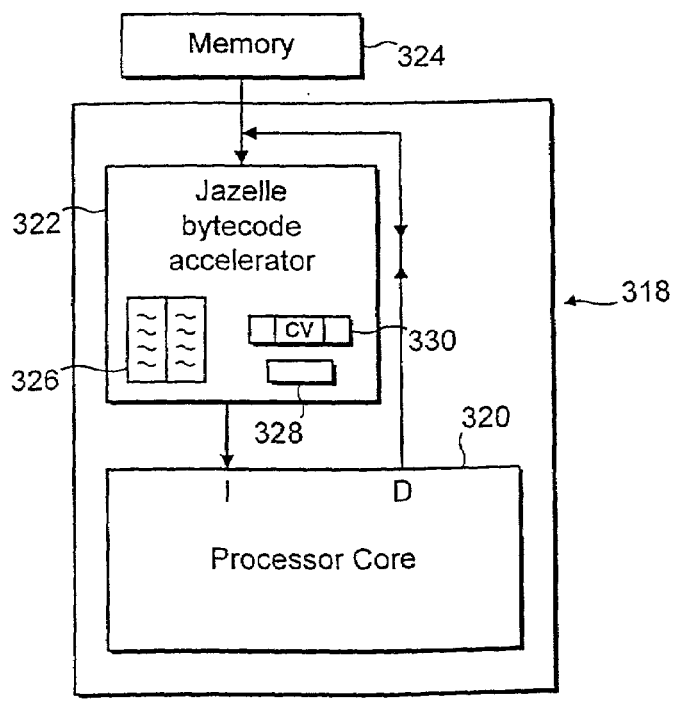
FIG. 18 illustrates a processing system including a processor core and a Java accelerator.

FIG. 18 schematically illustrates a data processing system 318 including a processor core 320 having a native instruction set (e.g. the ARM instruction set) and associated Java acceleration hardware 322. A memory 324 stores computer program code which may be in the form of ARM instructions or Java bytecodes. In the case of Java bytecodes, these are passed through the Java acceleration hardware 322 which serves to interpret them into a stream of ARM instructions (or control signals corresponding to ARM instructions) that may then be executed by the processor core 320. The Java acceleration hardware 322 includes a bytecode translation table 326 that requires programming for each Java Virtual Machine for which it is desired to execute Java bytecodes. Further a configuration data register 328 and an operating system control register 330 are provided within the Java acceleration hardware 322 to control its configuration. Included within the operating system control register 330 is a configuration valid indicator in the form of a flag CV that when set indicates that the configuration of the Java acceleration hardware 322 is valid and when unset that it is invalid.

The Java acceleration hardware 322 when it seeks to execute a Java bytecode is responsive to the configuration valid indicator to trigger a configuration invalid exception if the configuration valid indicator corresponds to the configuration data for the Java acceleration hardware 322 being in an invalid form. The configuration invalid exception handler can be an ARM code routine provided in a manner similar to that discussed above for the prefetch abort handler. A hardware mechanism is provided within the Java acceleration hardware 322 that sets the configuration valid indicator to the form indicating that the configuration data is valid as the configuration exception is triggered and before the new valid configuration data has actually been written into place. Whilst it may seem counter intuitive to set the configuration valid indicator in this way before the configuration data has actually been written, this approach has significant advantages in being able to avoid problems that can arise with process swaps part way through the setting of the configuration data. The configuration exception routine then sets up the required configuration data for the Java Virtual Machine to which it corresponds by writing the bytecode translation table entries as discussed previously and any other configuration data register values 328 as required. The configuration exception code must ensure that the writing of the configuration data is completed before any other tasks are undertaken by the Java acceleration hardware 322.

Figure 19:
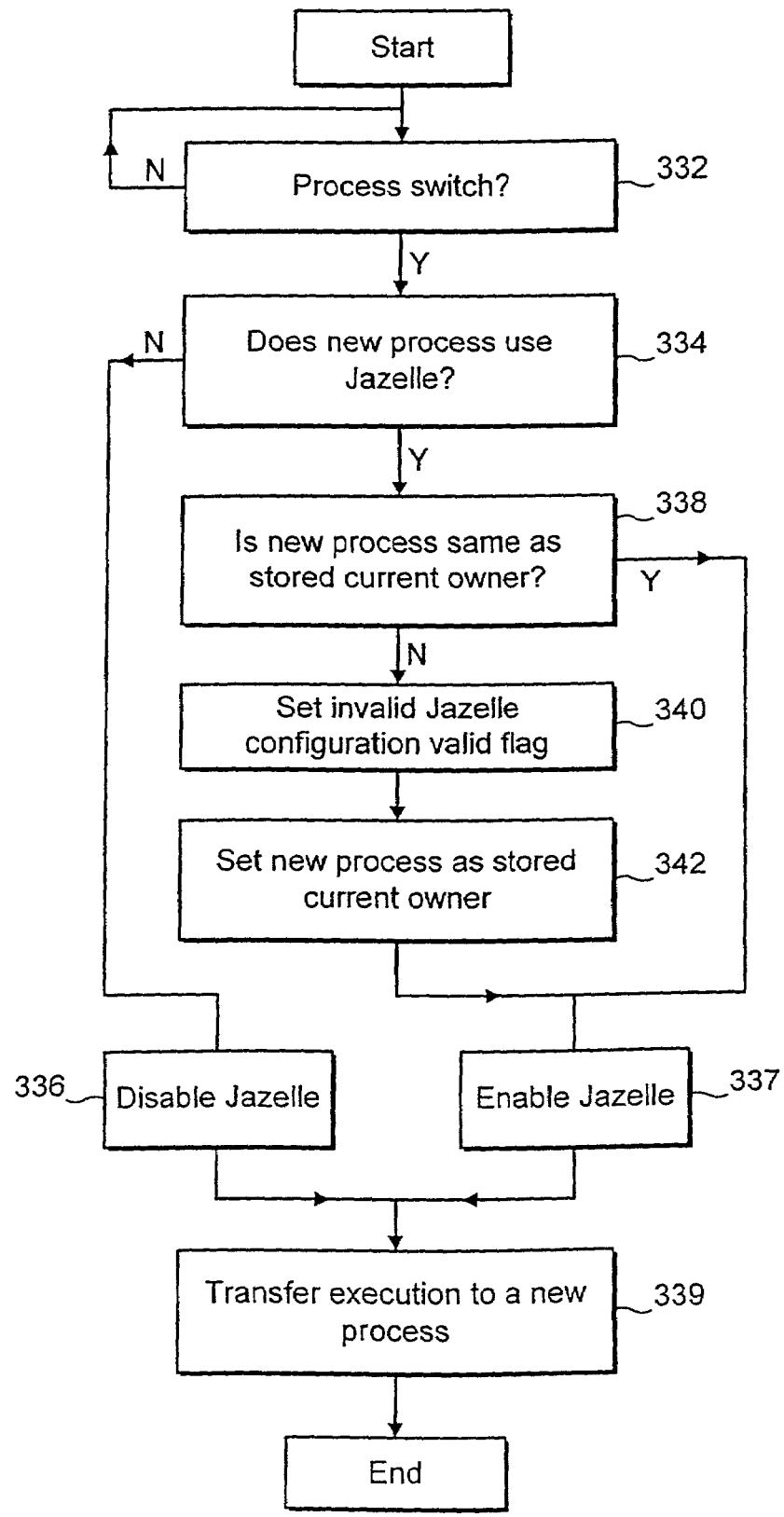
FIG. 19 is a flow diagram schematically illustrating the operations of an operating system in controlling the configuration of a Java accelerator.

FIG. 19 schematically illustrates the operation of the operating system 300. At step 332, the operating system waits to detect a process switch. When a process switch is detected, step 334 determines whether or not the new process is one that uses the Java acceleration hardware 322 (also, as previously mentioned, called Jazelle). If the Java acceleration hardware 322 is not used, then processing proceeds to step 336 at which the Java acceleration hardware 322 is disabled before proceeding to step 339 at which execution is transferred to the new process. If the Java acceleration hardware 322 is used, then processing proceeds to step 338 at which a determination is made as to whether or not the new process being invoked is the same as the stored current owner of the Java acceleration hardware 322 as recorded by the operating system 300. If the owner has not changed (i.e. the new process is in fact the same as the last process that used the Java acceleration hardware 322), then processing proceeds to step 337 at which the Java acceleration hardware 322 is enabled prior to proceeding to step 339. If the new process is not the stored current owner, then processing proceeds to step 340 at which the configuration valid indicator is set to indicate that the current configuration of the Java acceleration hardware 322 is not valid. This is the limit of the responsibility of the operating system 300 for managing this configuration change, the actual updating of the configuration data is left as a task to the Java acceleration hardware 322 itself operating with its own exception handling mechanisms.

After step 340, step 342 serves to update the stored current owner to be the new process before transfer of execution control is passed to step 337 and then step 339.

Figure 20:
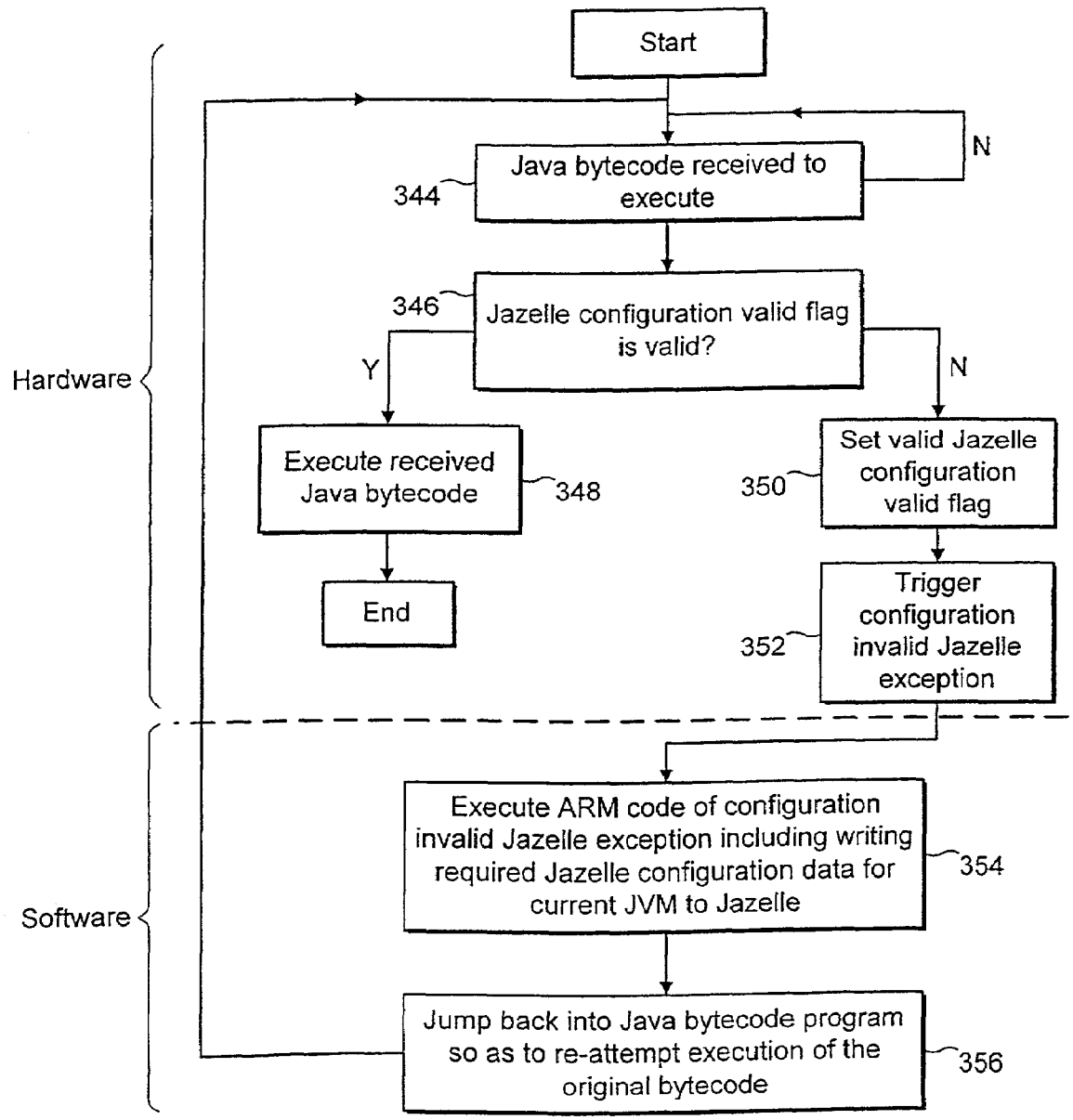
FIG. 20 is a flow diagram schematically illustrating the operation of a Java Virtual Machine in conjunction with a Java acceleration mechanism that it is using in controlling the configuration of the Java acceleration mechanism.

FIG. 20 illustrates the operations performed by the Java acceleration hardware 322. At step 344 the Java acceleration hardware 322 waits to receive a bytecode to execute. When a bytecode is received, the hardware checks that the configuration valid indicator shows that the configuration of the Java acceleration hardware 322 is valid using step 346. If the configuration is valid, then processing proceeds to step 348 at which the received bytecode is executed.

If the configuration is invalid, then processing proceeds to step 350 at which the Java acceleration hardware 322 uses a hardware mechanism to set the configuration valid indicator to show that the configuration is valid. This could also be done by a program instruction within the exception handler if desired. Step 352 serves to trigger a configuration invalid exception. The configuration invalid exception handler may be provided as a combination of a table of pointers to code fragments and appropriate code fragments for handling each of the exceptions concerned, such as software emulation of an instruction, a prefetch abort (both of which have been discussed above), as in this case, or a configuration exception.

Step 354 serves to execute the ARM code that makes up the configuration invalid exception and that serves to write the configuration data required to the Java acceleration hardware 322. This ARM code may take the form of a sequence of coprocessor register writes to populate the programmable translation table 326 as well as other configuration registers 330. After step 354, step 356 jumps back into the Java bytecode program so as to re-attempt execution of the original bytecode.

If a process switch occurs during step 354 or step 358, it is possible that the configuration set up so far will be made invalid by the other process and the configuration valid indicator cleared by the operating system. In the FIG. 20 procedure, this results in going around the 344-346-350-352-354-loop again, i.e. in reconfiguration being re-attempted from the start. When the bytecode does eventually actually get executed, the configuration is guaranteed to be valid.

FIG. 21 illustrates a data processing system as shown in FIG. 1 further incorporating a floating point subsystem. When an unhandled floating point operation occurs the floating point subsystem provides mechanisms to handle the unhandled floating point operation in ARM code.

An example of such a subsystem is the VFP software emulator system from ARM Limited of Cambridge, England. In the case of the VFP software emulator system all floating point operations are treated as unhandled floating point operations since there is no hardware available to perform the floating point operations. All floating point operations are therefore handled using the provided mechanisms to emulate the behaviour of the VFP in ARM code.

In the case of such systems unhandled floating point operations are precise, that is to say the point of detection of an unhandled floating point operation is the same as the point of occurance of the unhandled floating point operation.

FIG. 22 illustrates a data processing system as shown in FIGS. 1 and 21 further incorporating a floating point operation register and an unhandled operation state flag.

An example of such a subsystem is the VFP hardware system from ARM Limited of Cambridge, England. In the case of the VFP hardware system only certain types of floating point operation are treated as unhandled floating point operations, the remainder being handled by the VFP hardware.

The class of operations which may be subject to unhandled floating point operations include:
 division by zero
 operations involving a NaN
 operations involving an infinity
 operations involving denormalised numbers In the case of such systems unhandled floating point operation may be imprecise, that is to say the point of detection of an unhandled floating point operation is not necessarily the same as the point of occurance of the unhandled floating point operation.

An unhandled VFP operation occurs when the VFP coprocessor refuses to accept a VFP instruction that would normally form part of an ARM instruction stream but in the presence of a bytecode translator shown in FIG. 1 may be the result of a bytecode which has been translated into a combination of ARM and VFP instructions.

In the case that an unhandled VFP operation occurs as part of an ARM instruction stream, the ARM mechanism for handling the unhandled VFP operation is to generate an undefined instruction exception and execute the undefined instruction handler installed on the undefined instruction vector.

In the case of the VFP software emulator system all VFP operations are treated as unhandled VFP operations and the same ARM mechanism applies, an undefined instruction exception is generated and the undefined instruction handler is executed.

When the unhandled VFP operation occurs as part of the ARM instruction stream the undefined instruction handler can see by inspecting the instruction stream that the instruction which caused the unhandled VFP operation was indeed a VFP instruction, not some other kind of undefined instruction and as the undefined instruction handler executes in a priviledged mode it can issue the required coprocessor instructions to extract any internal state that it needs from the VFP coprocessor and complete the required instruction in software. The undefined instruction handler will use both the instruction identified in the ARM instruction stream and the internal state of the VFP to handle the unhandled operation.

On many VFP implementations, the instruction that caused the unhandled operation may not be the same as the instruction that was executing when the unhandled operation was detected. The unhandled operation may have been caused by an instruction that was issued earlier, executed in parallel with subsequent ARM instructions, but which encounters an unhandled condition. The VFP signals this by refusing to accept a following VFP instruction, forcing the VFP undefined-instruction handler to be entered which can interrogate the VFP to find the original cause of the unhandled operation.

When Jazelle is integrated into a system containing a VFP subsystem the following apply:

Java floating point instructions are translated by issuing the corresponding VFP instructions directly within the core using a set of signals having a direct correspondance to VFP instructions.

The VFP may signal an unhandled operation condition if it encounters an unhandled operation.

Jazelle intercepts the unhandled operation signal preventing it from being sent to the core and preventing the undefined instruction handler from executing as would happen if a VFP instruction in an ARM instruction stream signalled an incorrect operation. Instead Jazelle generates a Jazelle VFP exception which is handled by the Jazelle VM support code.

The VM support code, on encountering such a Jazelle VFP exception, should execute a VFP 'no-operation' instruction, ie. any VFP instruction which leaves the Jazelle state intact, such as an FMRX Rd, FPSCR instruction. This synchronises the VFP hardware with the support code and completes the operation of any VFP operation indicated by the floating point operation register in conjunction with the unhandled operation state flag which should be set in this case as an unhandled operation has just been encountered. Once the operation is complete the unhandled operation state flag will be cleared.

The approach exploits the fact that the instruction sequences issued by Jazelle are restartable as described in co-pending British Patent Application Number 0024402.0 filed on 5 Oct. 2000 which is incorporated herein in its entirety by reference. Use of the technique described in the above reference in conjunction with this technique allows the instruction which caused the generation of the VFP instruction which caused the unhandled operation to be restarted.

FIG. 23 illustrates for each of the Java floating point operations the corresponding VFP instructions which are issued by the Java bytecode translator. Note that only the VFP instruction which are issued are shown, the Java bytecode translator may issue additional ARM instruction(s) in conjunction with the VFP instructions. The Jazelle bytecode translator may also issue additional VFP loads and stores to load or store floating point values.

FIG. 24 illustrates a sequence of instructions or signals corresponding to instructions that might be issued by the Jazelle bytecode translator for the sequence of Java bytecodes consisting of a 'dmul' bytecode followed by a 'dcmpg' bytecode. The illustrated sequence would occur if a (dmul, dcmpg) bytecode sequence were to be executed at a time that the double-precision registers D0, D1, and D2 hold the third from top, second from top and top elements of the Java execution stack respectively, and that the integer result of the bytecode sequence is expected to be placed in the integer register R0.

Figure 29:
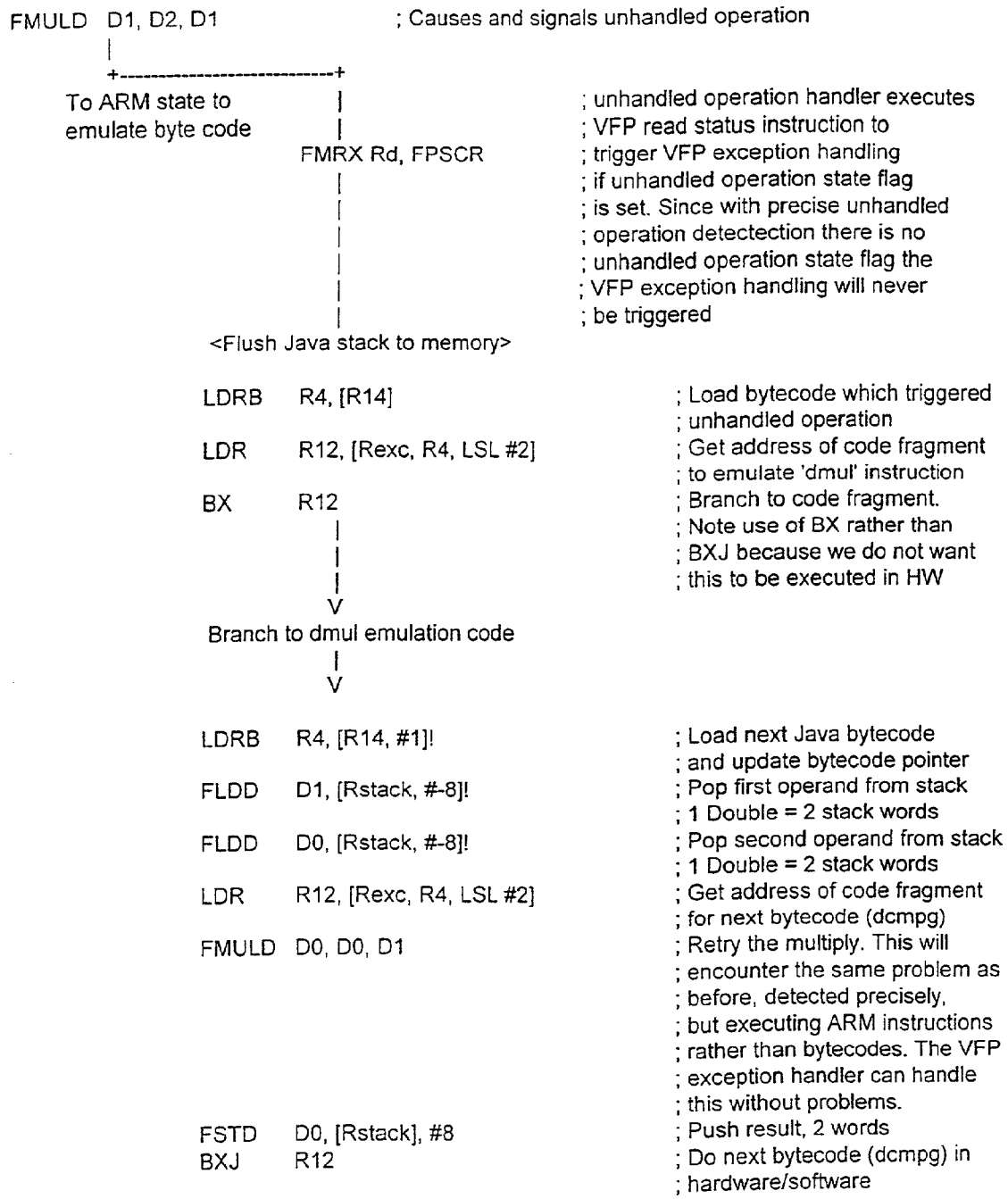
FIG. 29 shows the sequence of operations when executing a 'dmul' instruction followed by a 'dcmpg' instruction where an unhandled floating point operation is caused by execution of the FMULD instruction generated by the Java acceleration hardware for the Java 'dmul' instruction, the sequence of operations shown is for a system using precise unhandled operation detection corresponding to FIG. 21.

FIGS. 25, 27, 29 and 30 illustrate the sequence of operations when an unhandled floating point operation occurs at various points in the translated instruction sequence. FIGS. 25 and 29 illustrate the sequence of operations when the unhandled floating point operation is caused by the FMULD instruction. FIGS. 27 and 30 illustrate the sequence of operations when the unhandled floating point operation is caused by the FCMPD instruction. FIGS. 25 and 27 illustrate the sequence of operations when the signalling of unhandled floating point operations is imprecise. FIGS. 29 and 30 illustrate the sequence of operations when the signalling of unhandled floating point operations is precise.

As can be seen there are four possible sequence of events:

1) FIG. 25: Imprecise unhandled operation detection, Java bytecode which signals the unhandled operation is not the same as that which caused the unhandled operation.

2) FIG. 27: Imprecise unhandled operation detection, Java bytecode which signals the unhandled operation is the same as that which caused it despite the fact the the system uses imprecise unhandled operation detection. This is because the second Java bytecode 'dcmpg' issues 2 VFP instructions for the one Java bytecode, the first of which causes the unhandled operation, the second of which signals it.

3) FIG. 29: Precise unhandled operation detection, Java bytecode which signals the unhandled operation is the same as that which caused it.

4) FIG. 30: Precise unhandled operation detection, Java bytecode which signals the unhandled operation is the same as that which caused it, however it is not known which of the two VFP instructions issued as a result of executing the 'dcmpg' bytecode actually caused and signalled the unhandled operation.

The combination of above mentioned restarting technique with this technique allows all these possible sequences of events to be handled correctly.

Figure 26:
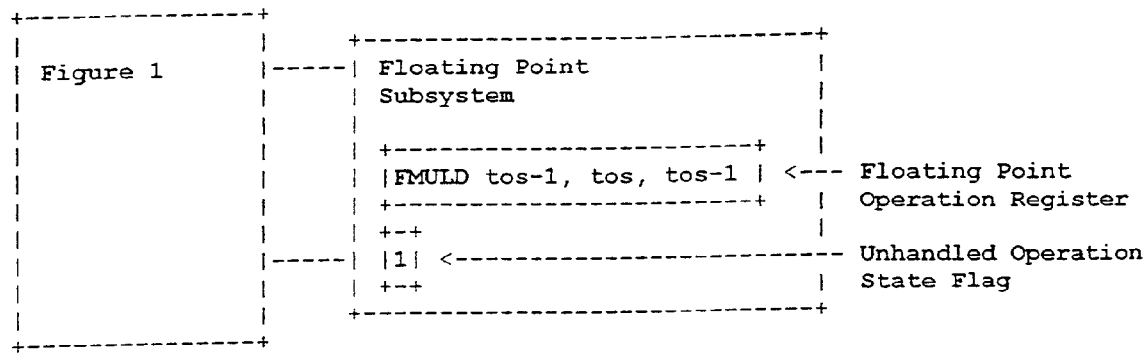
FIG. 26 shows the state of the Floating Point Operation Register and the Unhandled Operation State Flag after execution of the FMULD instruction in FIG. 25.
Figure 28:
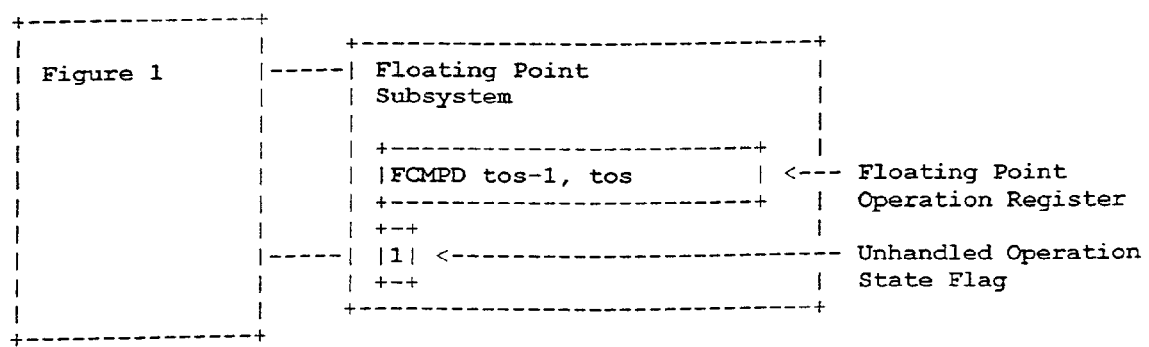
FIG. 28 shows the state of the Floating Point Operation Register and the Unhandled Operation State Flag after execution of the FCMPD instruction in FIG. 27.

FIGS. 26 and 28 illustrate the state of the floating point operation register and the unhandled operation state flag at the point immediately after the unhandled operation is caused corresponding to the sequence of operations illustrated in FIGS. 25 and 27 respectively.

Reference should be made to the co-pending British patent applications 0024399.8, 0024402.0, 0024404.6 and 0024396.4 all filed on 5 Oct. 2000, and British patent application 0028249.1 filed on 20 Nov. 2000 and U.S. patent application Ser. No. 09/731,060 filed on 7 Dec. 2000 which also describe a Java bytecode interpretation system. The disclosure of these co-pending applications is incorporated herein in its entirety by reference.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for processing data under control of program instructions from a first instruction set and one or more further instruction sets, said apparatus within a data processing system and comprising:
   (i) an unhandled operation detector for detecting an unhandled operation arising during execution of a program instruction of said first instruction set;
   (ii) an unhandled operation handler, upon detection of said unhandled operation, for triggering emulation of said instruction of said first instruction set using one or more instructions of at least one of said one or more further instruction sets; and
   (iii) an exception handling mechanism of said one or more further instruction sets for handling any further unhandled operation arising during said emulation of said instruction of said first instruction set.

2. Apparatus as claimed in claim 1, wherein said unhandled operation detector is a fetch abort detector for detecting unhandled fetching of an instruction word.

3. Apparatus as claimed in claim 1, wherein said unhandled operation detector is an unhandled floating point operation detector for detecting unhandled floating point operations.

4. Apparatus as claimed in claim 1, wherein said first instruction set is a variable length instruction set and at least one of said one or more further instruction sets is a fixed length instruction set.

5. Apparatus as claimed in claim 1, wherein said first instruction set is a variable length instruction set and all of said one or more further instruction sets are fixed length instruction sets.

6. Apparatus as claimed in claim 4, comprising:
   (i) an instruction fetcher for fetching fixed length instruction words containing program instructions to be executed, at least some program instructions from said variable length instruction set spanning more than one instruction word.

7. Apparatus as claimed in claim 6, wherein said unhandled operation detector is a fetch abort detector for aborting, upon detection of unhandled fetching of an instruction word that is a second or subsequent instruction word containing part of a variable length instruction, said variable length instruction and for triggering emulation of said variable length instruction using one or more fixed length instructions.

8. Apparatus as claimed in claim 6, wherein said unhandled operation detector is a fetch abort detector for aborting, upon detection of unhandled fetching of an instruction word where said variable length instruction is determined to cross a memory page boundary, said variable length instruction and for triggering emulation of said variable length instruction using one or more fixed length instructions.

9. Apparatus as claimed in claim 6, wherein said unhandled operation detector is a fetch abort detector for aborting, upon detection of unhandled fetching of an instruction word where said variable length instruction is determined to start within a fixed number of bytes of the end of a memory page boundary where said fixed number of bytes is smaller than the longest variable length instruction handled by said apparatus for processing data under control of program instructions from a first instruction set, said variable length instruction and for triggering emulation of said variable length instruction using one or more fixed length instructions.

10. Apparatus as claimed in claim 3, wherein a plurality of floating point operations may be executed during the execution of a single instruction of said first instruction set, any of said plurality of floating point operations potentially causing an unhandled floating point operation and said unhandled operation detector being an unhandled floating point operation detector operative to detect unhandled floating point operations generated by any of said plurality of floating point operations.

11. Apparatus as claimed in claim 3, wherein said unhandled operation detector does not immediately detect an unhandled floating point operation upon execution of an instruction of said first instruction set causing the unhandled floating point operation but instead detects the unhandled floating point operation upon execution of a subsequent instruction of said first instruction set, said unhandled operation detector being operable to abort said subsequent instruction and trigger emulation of said subsequent instruction using one or more fixed length instructions.

12. Apparatus as claimed in claim 11, wherein said unhandled operation detector only detects the unhandled floating point operation when said subsequent instruction also causes a floating point operation.

13. Apparatus as claimed in claim 11, further comprising an occurrence indicator to enable said unhandled operation handler to determine that an unhandled floating point operation has occurred.

14. Apparatus as claimed in claim 11 further comprising an operation indicator to enable determination of the floating point operation which caused the unhandled floating point operation.

15. Apparatus as claimed in claim 11 wherein said unhandled operation handler employs existing mechanisms for handling said unhandled operations prior to emulation of said instruction of said first instruction set.

16. Apparatus as claimed in claim 15 wherein said unhandled operation handler executes a fixed length floating point instruction, execution of said fixed length floating point instruction having the effect of employing existing mechanisms for handling said unhandled operations.

17. Apparatus as claimed in claim 1, wherein said second instruction set is a native instruction set of a processor core executing said program instructions.

18. Apparatus as claimed in claim 1, wherein said first instruction set is an interpreted instruction set.

19. Apparatus as claimed in claim 1, wherein said first instruction set comprises Java bytecode instructions.

20. Apparatus as claimed in claim 1, further comprising restart logic for restarting execution after said unhandled operation; wherein
said apparatus is configured to generate a sequence of one of more sets of translator output signals corresponding to instructions of one of said plurality of instruction sets to represent at least one instruction of said plurality of instruction sets, each sequence being such that no change is made to the input variables until a final operation within said sequence is executed; and
after occurrence of an unhandled operation during execution of a sequence of operations representing said at least one instruction of said plurality of instruction sets:
  (i) if said unhandled operation occurred prior to starting execution of a final operation in said sequence, then said restart logic restarts execution at a first operation in said sequence; and
  (ii) if said unhandled operation occurred after starting execution of a final operation in said sequence, then said restart logic restarts execution at a next instruction following said sequence.

21. A method of processing data under control of program instructions from a first instruction set and one or more further instruction sets, said method comprising the steps of:
  (i) detecting an unhandled operation arising during execution of a program instruction of said first instruction set;
  (ii) upon detection of said unhandled operation triggering emulation of said instruction of said first instruction set using one or more instructions of at least one of said one or more further instruction sets; and
  (iii) handling any further unhandled operation arising during emulation of said instruction of said first instruction set using an exception handling mechanism of said one or more further instruction sets.

22. A method as claimed in claim 21, wherein said step of detecting detects unhandled fetching of an instruction word.

23. A method as claimed in claim 21, wherein said step of detecting detects unhandled floating point operations.

24. A method as claimed in claim 21, wherein said first instruction set is a variable length instruction set and at least one of said one or more further instruction sets is a fixed length instruction set.

25. A method as claimed in claim 21, wherein said first instruction set is a variable length instruction set and all of said one or more further instruction sets are fixed length instruction sets.

26. A method as claimed in claim 24, comprising:
  (i) fetching fixed length instruction words containing program instructions to be executed, at least some program instructions from said variable length instruction set spanning more than one instruction word.

27. A method as claimed in claim 26, wherein upon detection of unhandled fetching of an instruction word that is a second or subsequent instruction word containing part of a variable length instruction, aborting said variable length instruction and triggering emulation of said variable length instruction using one or more fixed length instructions.

28. A method as claimed in claim 26, wherein upon detection of unhandled fetching of an instruction word where said variable length instruction is determined to cross a memory page boundary, aborting said variable length instruction and triggering emulation of said variable length instruction using one or more fixed length instructions.

29. A method as claimed in claim 26, wherein upon detection of unhandled fetching of an instruction word where said variable length instruction is determined to start with in a fixed number of bytes of the end of a memory page boundary where said fixed number of bytes is smaller than the longest variable length instruction handled aborting said variable length instruction and triggering emulation of said variable length instruction using one or more fixed length instructions.

30. A method as claimed in claim 23, wherein a plurality of floating point operations may be executed during the execution of a single instruction of said first instruction set, any of said plurality of floating point operations potentially causing an unhandled floating point operation said detection detecting unhandled floating point operations generated by any of said plurality of floating point operations.

31. A method as claimed in claim 23, wherein said detection does not immediately detect an unhandled floating point operation upon execution of an instruction of said first instruction set causing the unhandled floating point operation but instead detects the unhandled floating point operation upon execution of a subsequent instruction of said first instruction set so as to abort said subsequent instruction and trigger emulation of said subsequent instruction using one or more fixed length instructions.

32. A method as claimed in claim 31, wherein said detection only detects the unhandled floating point operation when said subsequent instruction also causes a floating point operation.

33. A method as claimed in claim 31, further comprising an occurrence indicator to enable said unhandled operation handler to determine that an unhandled floating point operation has occurred.

34. A method as claimed in claim 31 further comprising setting an indicator to enable determination of the floating point operation which caused the unhandled floating point operation.

35. A method as claimed in claim 31 wherein handling said unhandled operation employs existing mechanisms for handling said unhandled operations prior to emulation of said instruction of said first instruction set.

36. A method as claimed in claim 35 wherein handling said unhandled operation executes a fixed length floating point instruction, execution of said fixed length floating point instruction having the effect of employing existing mechanisms for handling said unhandled operations.

37. A method as claimed in claim 21, wherein said second instruction set is a native instruction set of a processor core executing said program instructions.

38. A method as claimed in claim 21, wherein said first instruction set is an interpreted instruction set.

39. A method as claimed in claim 21, wherein said first instruction set comprises Java bytecode instructions.

40. A method as claimed in claim 21, further comprising:
generating a sequence of one of more sets of translator output signals corresponding to instructions of one of said plurality of instruction sets to represent at least one instruction of said plurality of instruction sets, each sequence being such that no change is made to the input variables until a final operation within said sequence is executed; and
after occurrence of an unhandled operation during execution of a sequence of operations representing said at least one instruction of said plurality of instruction sets:
(i) if said unhandled operation occurred prior to starting execution of a final operation in said sequence, then said restart logic restarts execution at a first operation in said sequence; and
(ii) if said unhandled operation occurred after starting execution of a final operation in said sequence, then said restart logic restarts execution at a next instruction following said sequence.

41. A computer program product comprising a computer readable storage medium for controlling a data processing apparatus to processing data under control of program instructions from a first instruction set and one or more further instruction sets, said computer program product comprising:

(i) unhandled operation handler logic, upon detection of an unhandled operation arising during execution of an instruction of said first instruction set, for triggering emulation of said instruction that gave rise to said unhandled operation using one or more instructions of at least one of said one or more further instruction sets; and (ii) exception handling logic of said one or more further instruction sets for handling any further unhandled operations arising during said emulation of said instruction of said first instruction set.

42. A computer program product as claimed in claim 41, wherein said unhandled operation is unhandled fetching of an instruction word.

43. A computer program product as claimed in claim 41, wherein said unhandled operation is one or more unhandled floating point operations.

44. A computer program product as claimed in claim 41, wherein said first instruction set is a variable length instruction set and at least one of said one or more further instruction sets is a fixed length instruction set.

45. A computer program product as claimed in claim 41, wherein said first instruction set is a variable length instruction set and all of said one or more further instruction sets are fixed length instruction sets.

46. A computer program product as claimed in claim 44, wherein fixed length instruction words containing program instructions to be executed are fetched, at least some program instructions from said variable length instruction set spanning more than one instruction word.

47. A computer program product as claimed in claim 46, wherein upon detection of unhandled fetching of an instruction word that is a second or subsequent instruction word containing part of a variable length instruction, aborting said variable length instruction and triggering emulation of said variable length instruction using one or more fixed length instructions.

48. A computer program product as claimed in claim 46, wherein upon detection of unhandled fetching of an instruction word where said variable length instruction is determined to cross a memory page boundary, aborting said variable length instruction and triggering emulation of said variable length instruction using one or more fixed length instructions.

49. A computer program product as claimed in claim 46, wherein upon detection of unhandled fetching of an instruction word where said variable length instruction is determined to start within a fixed number of bytes of the end of a memory page boundary where said fixed number of bytes is smaller than the longest variable length instruction handled, aborting said variable length instruction and triggering emulation of said variable length instruction using one or more fixed length instructions.

50. A computer program product as claimed in claim 43, wherein a plurality of floating point operations may be executed during the execution of a single instruction of said first instruction set, any of said plurality of floating point operations potentially causing an unhandled floating point operation, wherein said detection of an unhandled floating point operation detects unhandled floating point operations generated by any of said plurality of floating point operations.

51. A computer program product as claimed in claim 43, wherein detection of an unhandled operation does not immediately detect an unhandled floating point operation upon execution of an instruction of said first instruction set causing the unhandled floating point operation but instead detects the unhandled floating point operation upon execution of a subsequent instruction of said first instruction set so as to abort said subsequent instruction and trigger emulation of said subsequent instruction using one or more fixed length instructions.

52. A computer program product as claimed in claim 51, wherein detecting unhandled operation only detects the unhandled floating point operation when said subsequent instruction also causes a floating point operation.

53. A computer program product as claimed in claim 51, further comprising occurrence indicator logic to enable said unhandled operation handler logic to determine that an unhandled floating point operation has occurred.

54. A computer program product as claimed in claim 51 further comprising operation indicator logic to enable determination of the floating point operation which caused the unhandled floating point operation.

55. A computer program product as claimed in claim 51 wherein said unhandled operation handler logic employs existing mechanisms for handling said unhandled operations prior to emulation of said instruction of said first instruction set.

56. A computer program product as claimed in claim 55 wherein said unhandled operation handler logic executes a fixed length floating point instruction, execution of said fixed length floating point instruction having the effect of employing existing mechanisms for handling said unhandled operations.

57. A computer program product as claimed in claim 41, wherein said second instruction set is a native instruction set of a processor core executing said program instructions.

58. A computer program product as claimed in claim 41, wherein said first instruction set is an interpreted instruction set.

59. A computer program product as claimed in claim 41, wherein said first instruction set comprises Java bytecode instructions.

60. A computer program product as claimed in claim 41 further comprising restart logic for restarting execution after said unhandled operation; wherein said data processing apparatus is operable to generate a sequence of one of more sets of translator output signals corresponding to instructions of one of said plurality of instruction sets to represent at least one instruction of said plurality of instruction sets, each sequence being such that no change is made to the input variables until a final operation within said sequence is executed; and after occurrence of an unhandled operation during execution of a sequence of operations representing said at least one instruction of said plurality of instruction sets:

(i) if said unhandled operation occurred prior to starting execution of a final operation in said sequence, then said restart logic restarts execution at a first operation in said sequence; and (ii) if said unhandled operation occurred after starting execution of a final operation in said sequence, then said restart logic restarts execution at a next instruction following said sequence.

* * * * *